(12) United States Patent
Xia et al.

(10) Patent No.: US 11,256,749 B2
(45) Date of Patent: Feb. 22, 2022

(54) GRAPH DATA PROCESSING METHOD AND APPARATUS, AND SYSTEM

(71) Applicant: HUAWEI TECHNOLOGIES CO., LTD., Guangdong (CN)

(72) Inventors: Yinglong Xia, Santa Clara, CA (US); Jian Xu, Shenzhen (CN); Mingzhen Xia, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 16/426,287

(22) Filed: May 30, 2019

(65) Prior Publication Data

US 2019/0278808 A1    Sep. 12, 2019

Related U.S. Application Data

(63) Continuation of application No. PCT/CN2017/112117, filed on Nov. 21, 2017.

(30) Foreign Application Priority Data

Nov. 30, 2016 (CN) .......................... 201611081960.0

(51) Int. Cl.
*G06F 15/16* (2006.01)
*G06F 16/901* (2019.01)
(Continued)

(52) U.S. Cl.
CPC ........ *G06F 16/9024* (2019.01); *G06F 9/4881* (2013.01); *G06F 9/50* (2013.01); *G06F 16/27* (2019.01)

(58) Field of Classification Search
None
See application file for complete search history.

(56) References Cited

U.S. PATENT DOCUMENTS

2013/0042082 A1\* 2/2013 Tamura ............... G06F 12/00
  711/154
2014/0143280 A1   5/2014 Duan et al.
(Continued)

FOREIGN PATENT DOCUMENTS

CN    101986661 A    3/2011
CN    102722553 A    10/2012
(Continued)

OTHER PUBLICATIONS

Yu Tao, "Research on Segmentation and Computing Platform of Large Scale Graphs," Fudan University, Chinese Excellent Master"s Dissertation Full-text Database, 2013, Issue 3, 2 pages (English abstract).

(Continued)

*Primary Examiner* — Alex Gofman
(74) *Attorney, Agent, or Firm* — Fish & Richardson P.C.

(57) ABSTRACT

A graph data processing method and a distributed system is disclosed. The distributed system includes a master node and a plurality of worker nodes. The master node obtains master node graph data, divides the graph data to obtain P shards, where the P shards include a first shard and a second shard. The master node determines at least two edge sets from each shard, schedules at least two edge sets included in the first shard to at least two worker nodes for processing, and schedules an associate edge set included in the second shard to the at least two worker nodes for processing, where the associate edge set is an edge set that includes an outgoing edge of a target vertex corresponding to the first shard.

14 Claims, 15 Drawing Sheets

(51) Int. Cl.
*G06F 16/27* (2019.01)
*G06F 9/48* (2006.01)
*G06F 9/50* (2006.01)

(56) References Cited

U.S. PATENT DOCUMENTS

| | | | | |
|---|---|---|---|---|
| 2014/0351239 | A1* | 11/2014 | Davis | G06F 16/24553 707/718 |
| 2015/0120697 | A1 | 4/2015 | Asner et al. | |
| 2015/0302063 | A1* | 10/2015 | Nigam | G06F 16/2471 707/770 |
| 2016/0110434 | A1 | 4/2016 | Kakaraddi et al. | |
| 2017/0083566 | A1* | 3/2017 | Das | G06F 16/283 |
| 2017/0091334 | A1* | 3/2017 | Kabiljo | G06F 16/24578 |

FOREIGN PATENT DOCUMENTS

| | | |
|---|---|---|
| CN | 103294807 A | 9/2013 |
| CN | 103631878 A | 3/2014 |
| CN | 104331270 A | 2/2015 |
| CN | 104572651 A | 4/2015 |
| CN | 104899156 A | 9/2015 |
| CN | 104952032 A | 9/2015 |
| CN | 105138536 A | 12/2015 |
| CN | 105205033 A | 12/2015 |
| CN | 105224528 A | 1/2016 |
| CN | 105590321 A | 5/2016 |
| CN | 105677755 A | 6/2016 |
| CN | 106202175 A | 12/2016 |
| CN | 106354729 A | 1/2017 |

OTHER PUBLICATIONS

Office Action issued in Chinese Application No. 201611081960.0 dated Mar. 25, 2021, 30 pages (with English translation).
Gonzalez et al., "GraphX: Graph Processing in a Distributed Dataflow Framework" 11th USENIX Symposium on Operating Systems Design and Implementation Oct. 6-8, 2014, 16 pages.
Ham et al., "Graphicionado: A High-Performance and Energy-Efficient Accelerator for Graph Analytics", IEEE/ACM MICRO 2016, 13 pages.
Kyrola, et al., "GraphChi: Large-scale graph computation on just a PC" 10th USENIX Symposium on Operating Systems Design and Implementation, OSDI 2012, 16 pages.
Low, et al., "GraphLab: A New Parallel Framework for Machine Learning" arXiv:1006.4990v1 [cs.LG], Jun. 25, 2010, 11 pages.
PCT International Search Report and Written Opinion in International Application No. 2017/112,117, dated Feb. 26, 2018, 16 pages (With English translation).
Wu et al., "Big Data Management and Processing, part 17, Large Graph Computing Systems" K29224_C017, 2017, 18 pages.
Zhou et al., "Fast Iterative Graph Computation with Resource Aware Graph Parallel Abstractions" HPDC'15, Jun. 15-20, 2015, 12 pages.
Zhu et al., "Gemini: A Computation-Centric Distributed Graph Processing System" 12th USENIX Symposium on Operating Systems Design and Implementation, Nov. 2-4, 2016, 17 pages.
Tychyg's Blog (online), "Summary of Clustering Algorithms in Complex Networks," post by user "Have Fun with Data" (FDI#KE), retrieved from URL <https://www.cnblogs.com/tychyg/p/5277137.html>, Mar. 2016, 8 pages (with English abstract).
Chitra et al., "Global Vertex-Edge Domination Sets in Total Graph and Product Graph of Path Pn Cycle Cn," International Conference on Mathematical Modelling and Scientific Computation, Mar. 2012, 10 pages.
Office Action issued in Chinese Application No. 201611081960.0 dated Sep. 24, 2021, 7 pages (with English translation).

* cited by examiner

GRAPH DATA PROCESSING METHOD AND APPARATUS, AND SYSTEM

CROSS-REFERENCE TO RELATED APPLICATIONS

This application is a continuation of International Patent Application No. PCT/CN2017/112117, filed on Nov. 21, 2017, which claims priority to Chinese Patent Application No. 201611081960.0, filed on Nov. 30, 2016. The disclosures of the aforementioned applications are hereby incorporated by reference in their entireties.

TECHNICAL FIELD

The present invention relates to the field of Internet technologies, and specifically, to a graph data processing method and apparatus, and a system.

BACKGROUND

With rapid development of the Internet, a data volume in the network increases explosively. Valuable information may be obtained by analyzing mass data, so as to discover a new market opportunity or a new business model. However, the data volume in the network is extremely large. To improve data analysis efficiency, data needs to be modeled, that is, data needs to be presented by using a specific model. A graph is excellent in model presentation. The graph can visually present correlated entities and relationships between the entities. Therefore, in many big data analysis scenarios, to-be-processed data is presented in a graph form, and the graph is analyzed and processed, to obtain information required by a user. Data presented in a graph form is usually referred to as graph data, and analysis and processing of the graph data are also referred to as graph computing. A vertex of the graph stores a value corresponding to an entity, and an edge indicates a relationship between entities. Typically, social network data, a call detail record (CDR), a reference relationship between essays, financial transaction data, and the like may be modeled by using a graph. The graph computing has become a basic module in a big data processing system.

As shown in FIG. 1, the graph computing is widely applied. For example, a telecom field, a security field, a financial field, and other fields are all related to mining and analysis of big data, to support upper-layer application decision and operation. Data required for each field is collected from the mass data, and then presented in a graph form. Finally, the graph data is processed by using a data mining method such as large-scale relationship computing and a machine learning algorithm, to obtain data valuable to each field.

Because graph data increases rapidly in scale, the scale of the to-be-processed graph data may exceed an entire memory of a graph processing system. As a result, a graph processing task fails. In addition, because the graph data is closely related, if only a part of the graph data is loaded to the memory for processing at a time, an adjacency relationship between vertexes in the graph data is usually destroyed. As a result, the data is poor in locality. Due to the poor locality of the data, data related to currently computed data needs to be read from a magnetic disk frequently in a graph computing process. This causes large I/O overheads.

SUMMARY

To better support large-scale graph computing, embodiments of the present invention provide a graph data processing method, to use massive memory resources in a distributed system to process graph data. This ensures normal processing of mass graph data, and reduces I/O overheads of the system. The embodiments of the present invention further provide a corresponding apparatus and system.

According to a first aspect of the present invention, a graph data processing method in a distributed system is provided. The distributed system includes a master node and a plurality of worker nodes. The master node and the worker nodes may be physical hosts connected by using a network, or may be virtual machines deployed on commodity hardware resources. The method includes: obtaining, by the master node, graph data, where the graph data may be obtained by the master node from a specific data source such as a database or a file system, or may be obtained by the master node from a storage resource of the master node, the graph data includes M vertexes and a plurality of directional edges, each edge connects two of the M vertexes, a direction of each edge is from a source vertex to a destination vertex in the two vertexes, and M is an integer greater than 2; dividing, by the master node, the graph data, to obtain P shards, where each shard includes an incoming edge of at least one target vertex, the incoming edge is an edge directed to the target vertex, a sum of quantities of target vertexes corresponding to the P shards is equal to M, the target vertices corresponding to each shard are different, P is a positive integer greater than 1, and the P shards include a first shard and a second shard; determining, by the master node, at least two edge sets from each shard; scheduling, by the master node to at least two worker nodes for processing, at least two edge sets included in the first shard in the P shards; and scheduling, by the master node to the at least two worker nodes for processing, an associate edge set included in the second shard, where the associate edge set is an edge set that includes an outgoing edge of a target vertex corresponding to the first shard, and the outgoing edge is an edge directed from the target vertex in the first shard. The at least two worker nodes are worker nodes to which the edge sets are scheduled, and a quantity of at least two edge sets is not less than a quantity of at least two worker nodes. It can be learned from the first aspect that the graph data is processed by using the distributed system. The graph data is processed into the shards. Then, the shard is further divided into the edges sets. Edge sets in a same shard are scheduled to at least two worker nodes for graph data processing. Massive memory resources in the distributed system are fully used to process the graph data. This ensures normal processing of mass graph data, improves scalability of graph processing in a distributed computing environment, and improves overall throughput of the system. In addition, the outgoing edge of the target vertex in the second shard is scheduled to a worker node of the incoming edge, to reduce input/output (I/O) overheads of communication between the worker nodes and ensure timeliness of graph computing.

With reference to the first aspect, in a first possible implementation, the step of determining, by the master node, at least two edge sets from each shard includes: filling, by the master node, values of edges in the P shards into a data structure in a P×P matrix form according to directions of edges, to obtain $P^2$ data blocks, where each data block is an edge set, each shard includes at least two data blocks, the P×P matrix is formed by using the M vertexes as a horizontal axis and a vertical axis; and if a vertex on the horizontal axis is a source vertex, a vertex on the vertical axis is a destination vertex; or if a vertex on the horizontal axis is a destination vertex, a vertex on the vertical axis is a source vertex. If the shards include a same quantity of target vertexes, the data blocks have a same size. If the shards include different quantities of target vertexes, the data blocks may have different sizes. It can be learned from the first possible implementation of the first aspect that an edge set is determined in a matrix form, so that the edge set is determined in a more orderly way, thereby improving efficiency of determining the edge set, and further improving efficiency of graph data processing.

With reference to the first possible implementation of the first aspect, in a second possible implementation, the method further includes: setting, by the master node, a unique block identifier for each of the $P^2$ data blocks; determining, by the master node, a correspondence between the block identifiers of the $P^2$ data blocks and a plurality of worker nodes; and scheduling, by the master node according to the correspondence to the at least two worker nodes for processing, at least two data blocks included in the first shard. It can be learned from the second possible implementation of the first aspect that the data blocks can be scheduled according to the block identifiers after the block identifiers are set for the data blocks. Therefore, the data blocks are scheduled in a more orderly and more efficient way, so as to improve efficiency of graph data processing.

With reference to the second possible implementation of the first aspect, in a third possible implementation, the step of scheduling, by the master node to the at least two worker nodes for processing, an associate edge set included in the second shard includes: scheduling, by the master node according to the correspondence to the at least two worker nodes for processing, data blocks corresponding to the associate edge set. It can be learned from the third possible implementation of the first aspect that the data blocks in the second shard are also scheduled according to block identifiers. Therefore, the data blocks are scheduled in a more orderly and more efficient way, so as to improve efficiency of graph data processing.

With reference to the second or the third possible implementation of the first aspect, in a fourth possible implementation, the method further includes: setting, by the master node, a synchronization flag, where the synchronization flag is used to instruct a worker node where a first data block is located to perform data synchronization with a worker node where a second data block is located after processing the first data block, the first data block is a last scheduled data block according to a scheduling sequence in the first shard, and the second data block is a last scheduled data block in the data blocks corresponding to the associate edge set. It can be learned from the fourth possible implementation of the first aspect that a synchronization flag needs to be set for worker nodes processing a same group of edge sets to instruct a worker node to perform data synchronization with one or more other worker nodes according to the synchronization flag after the worker node processing a last edge set of the same group, to ensure graph data consistency.

With reference to the first aspect, in a fifth possible implementation, the determining, by the master node, at least two edge sets from each shard includes: determining, by the master node, a degree of a target vertex in each shard, where the degree indicates closeness of association between the target vertex and another vertex; and when a degree of a first target vertex exceeds a preset threshold, classifying, by the master node, incoming edges of the first target vertex into a same edge set. It can be learned from the fifth possible implementation of the first aspect that, to reduce I/O overheads, the edge set may be further obtained by means of classification according to the degree of the target vertex. Incoming edges of target vertexes whose degrees exceed a preset threshold are classified to a same edge set, to reduce I/O overheads of communication between the worker nodes.

According to a second aspect of the present invention, a graph data processing method is provided. The method is applied to a distributed system. The distributed system includes a master node and a plurality of worker nodes. Each worker node includes an I/O interface, a hard disk, a memory, and a processor. The method includes: receiving, by a first worker node by using an I/O interface, X edge sets that are scheduled by the master node according to a scheduling sequence from P shards, where the P shards are obtained after the master node divides graph data, the graph data includes M vertexes and a plurality of directional edges, each edge connects two of the M vertexes, a direction of each edge is from a source vertex to a destination vertex in the two vertexes, M is an integer greater than 2, each shard includes an incoming edge of at least one target vertex, the incoming edge is an edge directed to the target vertex, a sum of quantities of target vertexes corresponding to the P shards is equal to M, the target vertices corresponding to each shard are different, P is a positive integer greater than 1, and X is a positive integer; storing the X edge sets in a hard disk by using the I/O interface of the first worker node; and loading, by a processor of the first worker node to a memory according to the scheduling sequence of the master node, Y edge sets in the X edge sets stored in the hard disk, and extracting data of Z edge sets from the memory for graph computing, where $X \geq Y \geq Z$, and X, Y, and Z are all positive integers. It can be learned from the second aspect that the graph data is processed by using the distributed system, so that massive memory resources in the distributed system are fully used to process the graph data. This ensures normal processing of mass graph data, improves scalability of graph processing in a distributed computing environment, and improves overall throughput of the system. In addition, the worker node performs streaming processing on edge sets in a multilevel loading manner according to the scheduling sequence of the master node from the hard disk to the memory and then from the memory to the processor, so as to reduce memory occupation, reduce memory overheads, and improve efficiency of graph computing.

With reference to the second aspect, in a first possible implementation, each edge set is a data block, the P shards include $P^2$ data blocks, the $P^2$ data blocks are obtained after the master node fills values of edges in the P shards into a data structure in a P×P matrix form according to directions of edges, the P shards include a first shard and a second shard, and the method further includes: performing, by the processor of the first worker node, data synchronization with a second worker node where a second data block is located according to a synchronization flag after the processor of the first worker node processing a first data block, where the first data block is a data block that is last scheduled to the first worker node according to a scheduling sequence in the first shard, and the second data block is a data block that is last scheduled to the second worker node in the second shard and that includes an outgoing edge of a target vertex corresponding to the first shard. It can be learned from the first possible implementation of the second aspect that a synchronization flag needs to be set for worker nodes processing a same group of edge sets to instruct a worker node to perform data synchronization with one or more other worker nodes according to the synchronization flag after the worker node processing a last edge set of the same group, to ensure graph data consistency.

According to a third aspect of the present invention, a graph data processing apparatus is provided. The apparatus is configured to implement a function of the method provided in the first aspect or any optional implementation of the first aspect, and is implemented by using hardware/software. The hardware/software includes units corresponding to the foregoing function.

According to a fourth aspect of the present invention, a graph data processing apparatus is provided. The apparatus is configured to implement a function of the method provided in the second aspect or any optional implementation of the second aspect, and is implemented by using hardware/software. The hardware/software includes units corresponding to the foregoing function.

According to a fifth aspect of the present invention, a graph data processing apparatus is provided. The graph data processing apparatus may be a master node in a distributed system. The distributed system further includes a plurality of worker nodes. The graph data processing apparatus includes an I/O interface, a memory, a hard disk, and a processor. The I/O interface is configured to obtain graph data. The graph data may be obtained from an external database, or may be obtained from a storage resource of the graph data processing apparatus, for example, obtained from a hard disk. The graph data includes M vertexes and a plurality of directional edges, each edge connects two of the M vertexes, a direction of each edge is from a source vertex to a destination vertex in the two vertexes, and M is an integer greater than 2. The processor is configured to divide the graph data, to obtain P shards, where each shard includes an incoming edge of at least one target vertex, the incoming edge is an edge directed to the target vertex, a sum of quantities of target vertexes corresponding to the P shards is equal to M, the target vertices corresponding to each shard are different, P is a positive integer greater than 1, and the P shards include a first shard and a second shard. The processor of the graph data processing apparatus is further configured to: determine at least two edge sets from each shard; schedule, by using the I/O interface to at least two worker nodes for processing, at least two edge sets included in the first shard; and schedule, to the at least two worker nodes for processing, an associate edge set included in the second shard, where the associate edge set is an edge set that includes an outgoing edge of a target vertex corresponding to the first shard, and the outgoing edge is an edge directed from the target vertex in the first shard. The at least two worker nodes are worker nodes to which the edge sets are scheduled, and a quantity of at least two edge sets is not less than a quantity of at least two worker nodes.

With reference to the fifth aspect, the processor is specifically configured to implement a function of the method provided in the first aspect or any optional implementation of the first aspect.

According to a sixth aspect of the present invention, a graph data processing apparatus is provided. The graph data processing apparatus may be a worker node in a distributed system. The distributed system further includes a master node. The graph data processing apparatus includes an I/O interface, a memory, a hard disk, and a processor. The I/O interface is configured to receive X edge sets that are scheduled by the master node according to a scheduling sequence from P shards, where the P shards are obtained after the master node divides graph data, the graph data includes M vertexes and a plurality of directional edges, each edge connects two of the M vertexes, a direction of each edge is from a source vertex to a destination vertex in the two vertexes, M is an integer greater than 2, each shard includes an incoming edge of at least one target vertex, the incoming edge is an edge directed to the target vertex, a sum of quantities of target vertexes corresponding to the P shards is equal to M, the target vertices corresponding to each shard are different, P is a positive integer greater than 1, and X is a positive integer. The hard disk is configured to store the X edge sets received by using the I/O interface. The processor loads, to the memory according to the scheduling sequence of the master node, Y edge sets in the X edge sets stored in the hard disk, and extracts data of Z edge sets from the memory for graph computing, where $X \geq Y \geq Z$, and X, Y, and Z are all positive integers.

With reference to the sixth aspect, the processor is configured to implement a function of the method provided in the second aspect or any optional implementation of the second aspect, and is implemented by using hardware/software. The hardware/software includes units corresponding to the foregoing function.

According to a seventh aspect of the present invention, a computer storage medium is provided. The computer storage medium stores a graph data processing program in the first aspect or any optional implementation of the first aspect.

According to an eighth aspect of the present invention, a computer storage medium is provided. The computer storage medium stores a graph data processing program in the second aspect or any optional implementation of the second aspect.

According to a ninth aspect of the present invention, a distributed system is provided. The distributed system includes a master node and a plurality of worker nodes. Both the master node and the worker nodes may be independent physical hosts, or may be virtual machines configured on a physical host. The master node may be the graph data processing apparatus described in the third aspect or the fifth aspect. The worker node may be the graph data processing apparatus described in the fourth aspect or the sixth aspect.

According to a tenth aspect of the present invention, a graph data processing method is provided. The method is applied to a distributed system. The distributed system includes a master node and a plurality of worker nodes. The master node and the worker nodes may be independent physical hosts, or may be virtual machines configured on a physical host. The method includes: obtaining, by the master node, graph data, where the graph data may be obtained by the master node from a database, or may be obtained by the master node from a storage resource of the master node, the graph data includes M vertexes and a plurality of directional edges, each edge connects two of the M vertexes, a direction of each edge is from a source vertex to a destination vertex in the two vertexes, and M is a positive integer greater than 2; determining, by the master node, at least two edge sets from the graph data; and scheduling, by the master node, the at least two edge sets to at least two of the plurality of worker nodes for graph computing. It can be learned from the tenth aspect that the graph data is processed by using the distributed system. The edge sets are scheduled to the at least two worker nodes for graph data processing. Massive memory resources in the distributed system are fully used to process the graph data. This ensures normal processing of mass graph data, improves scalability of graph processing in a distributed computing environment, and improves overall throughput of the system.

DESCRIPTION OF EMBODIMENTS

Embodiments of the present invention provide a graph data processing method, to process and store graph data by using massive memory resources in a distributed system. This ensures normal processing of mass graph data, improves scalability of graph processing in a distributed computing environment, improves overall throughput of the system, and reduces input/output (I/O) overheads of communication between worker nodes. The embodiments of the present invention further provide a corresponding apparatus and system. Details are separately provided in the following.

The following describes the technical solutions in the embodiments of the present invention with reference to the accompanying drawings in the embodiments of the present invention. Apparently, the described embodiments are merely some but not all of the embodiments of the present invention. In this specification, claims, and accompanying drawings of the present invention, the terms "first", "second", "third", "fourth", and the like (if exists) are intended to distinguish between similar objects but do not necessarily indicate a specific order or sequence.

Figure 1:
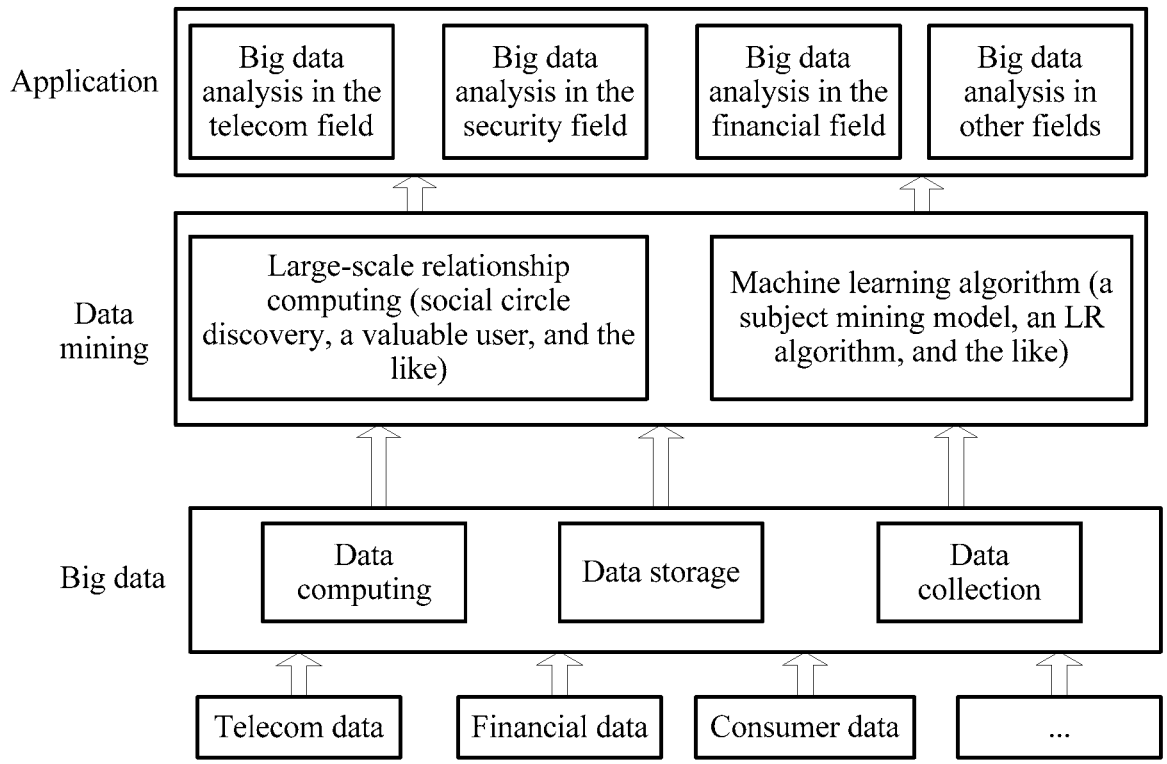
FIG. 1 is a schematic diagram of graph data mining and application.
Figure 2:
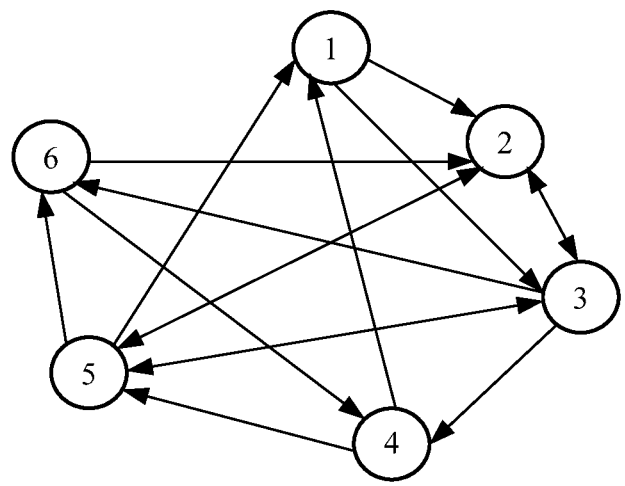
FIG. 2 is a schematic diagram of a presentation form of graph data according to an embodiment of the present invention.

For a graph (also referred to as graph data in the embodiments of the present invention), for example, as shown in FIG. 2, FIG. 2 includes six entities represented by using numbers 1 to 6. The entities in a graph may be referred to as vertexes. A relationship between the entities is indicated by using an edge. An arrow on the edge indicates a direction. Each edge connects two vertexes. A direction of each edge is from a source vertex to a destination vertex in the two vertexes. That is, a vertex from which the edge starts is the source vertex, and a vertex at which the arrow is directed is the destination vertex. Each edge has a corresponding value.

FIG. 2 shows only a schematic diagram of simple graph data. In a specific application scenario, the graph data is more large and complex. The graph data may include thousands of vertexes and many edges. Therefore, processing of the graph data requires massive hardware resources, and hardware resources of a single-chip microcomputer or one physical machine can hardly meet a requirement for processing the graph data.

Figure 3A:
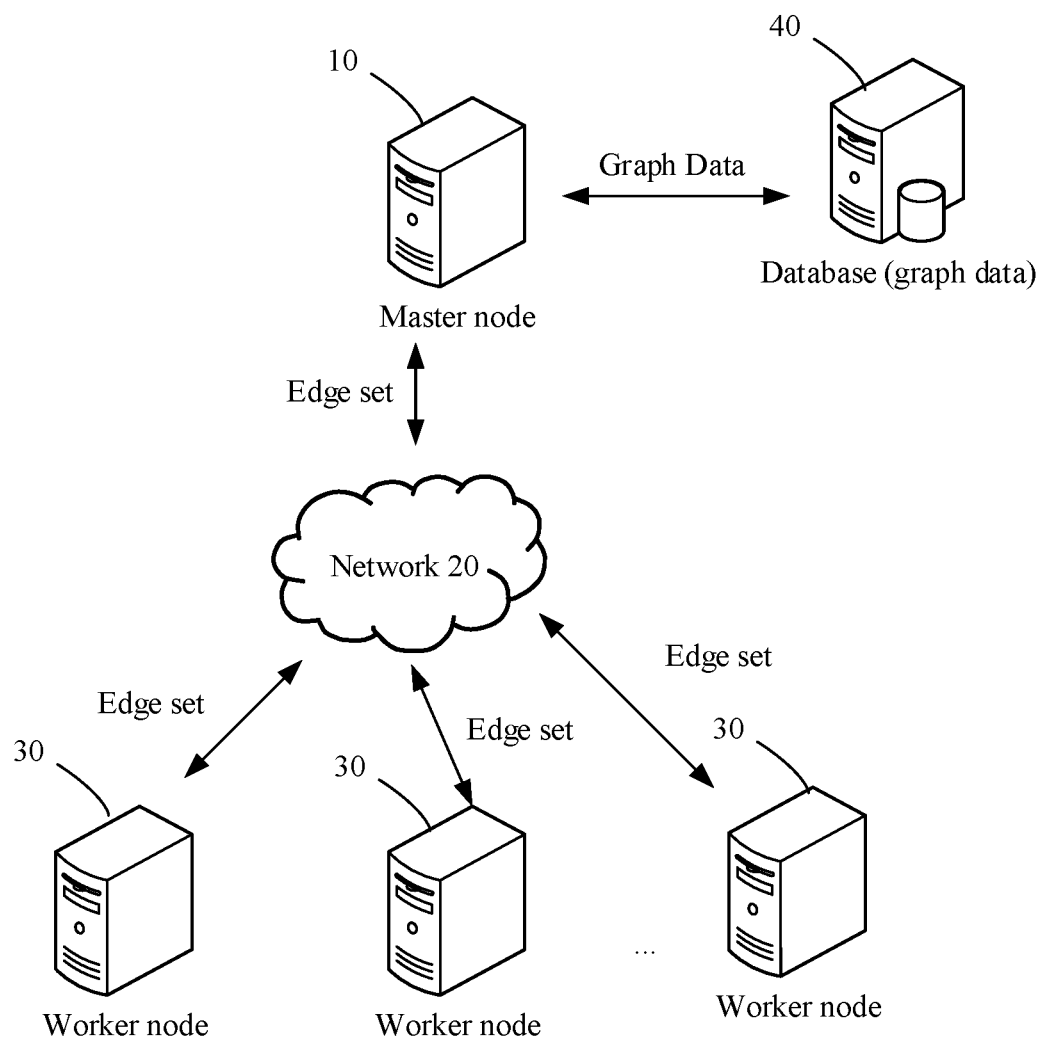
FIG. 3A is a schematic diagram of a network structure in a distributed system according to an embodiment of the present invention.
Figure 3B:
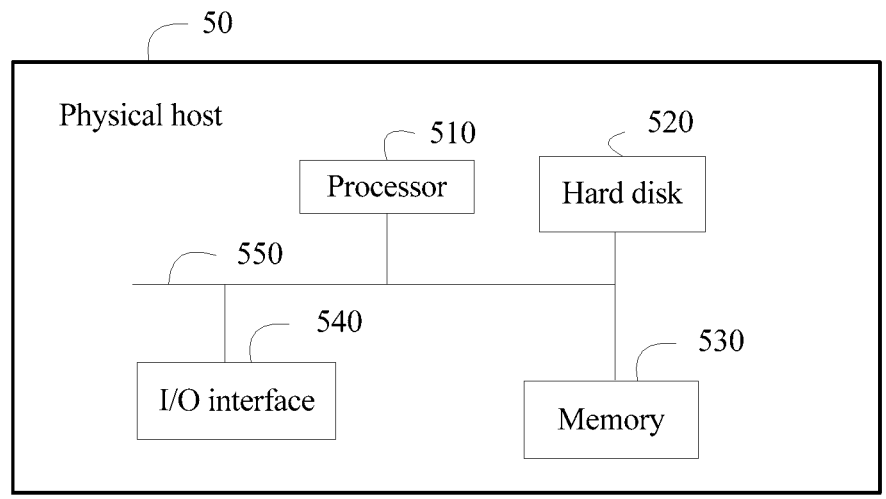
FIG. 3B is a schematic structural diagram of a physical host.

An embodiment of the present invention provides a distributed system. The distributed system can be used to process graph data. As shown in FIG. 3A, the distributed system provided in this embodiment of the present invention includes a master node (Master) 10, a network 20, a plurality of worker nodes (Worker) 30, and a database 40. The master node 10 and the plurality of worker nodes 30 can communicate with each other through the network 20. The database 40 can store graph data. The master node 10 can read to-be-processed graph data from the database 40. There may be one or more master nodes 10 in this embodiment of the present invention. For example, to ensure reliability of the system, a secondary master node may be deployed, to share some load when a currently running master node is overloaded, or take over the job of a currently running master node that is faulty. The master node 10 and the worker nodes 30 may be physical hosts. For a hardware structure of a physical host, refer to FIG. 3B for understanding. As shown in FIG. 3B, a physical host 50 includes a processor 510, a hard disk 520, a memory 530, an I/O interface 540, and a bus 550. The processor 510, the hard disk 520, the memory 530, and the I/O interface 540 are communicatively connected to each other by using the bus 550. Two physical hosts can be connected to each other through the I/O interface and the network 20.

Figure 3C:
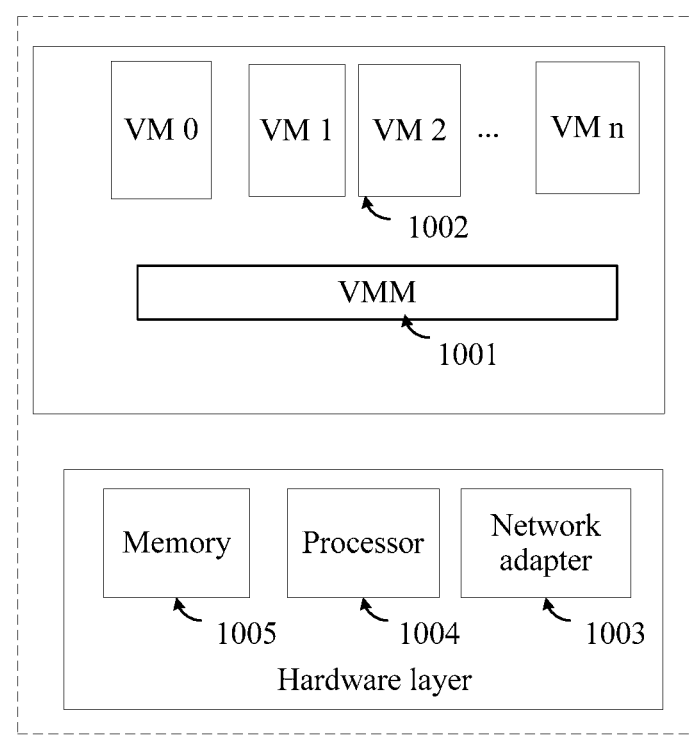
FIG. 3C is a schematic structural diagram of a distributed system in a virtualization scenario according to an embodiment of the present invention.

In addition, the distributed system provided in this embodiment of the present invention may be a distributed system in a virtualization scenario. The distributed system in the virtualization scenario is shown in FIG. 3C. The distributed system in the virtualization scenario includes a hardware layer, a virtual machine monitor (VMM) 1001 running at the hardware layer, and a plurality of virtual machines 1002. One or more virtual machines may be selected as the master node, and a plurality of virtual machines may be selected as the worker nodes.

Specifically, the virtual machines 1002 are one or more virtual computers that are simulated on a common hardware resource by using virtual machine software. The virtual machine works like a real computer. An operating system and an application program can be installed on the virtual machine. The virtual machine can further access a network resource. For an application program running on the virtual machine, the virtual machine works like a real computer.

The hardware layer is a hardware platform running in the virtualization environment, and may be abstract hardware resources of one or more physical hosts. The hardware layer may include various types of hardware. For example, the hardware layer includes a processor 1004 (for example, a CPU) and a memory 1005, and may further include a network adapter 1003 (for example, an RDMA network adapter), a high-speed/low-speed input/output (I/O) device, and another device with a specific processing function.

In addition, the distributed system in the virtualization scenario may further include a host (Host) serving as a management layer, to manage and allocate a hardware resource, present a virtual hardware platform for the virtual machines, and implement scheduling and isolation of the virtual machines. The host may be a virtual machine monitor (VMM). In addition, the VMM sometimes cooperates with a privileged virtual machine to form a host. The virtual hardware platform provides various hardware resources for the virtual machines running on the virtual hardware platform. For example, the virtual hardware platform provides a virtual processor (for example, a VCPU), a virtual memory, a virtual disk, a virtual network adapter, or the like. The virtual disk may be corresponding to a file or a logical block device of the host. The virtual machines run on the virtual hardware platform that is prepared by the host for the virtual machines, and one or more virtual machines run on the host.

The privileged virtual machine is a special virtual machine that may also be referred to as a drive domain. For example, the special virtual machine is referred to as Dom0 on a Xen Hyperviserver platform. Drivers of real physical devices such as a network adapter and a SCSI disk are installed in the virtual machine, so as to detect and directly access these real physical devices. Another virtual machine uses a corresponding mechanism provided by the Hypervisor to access the real physical devices by using the privileged virtual machine.

The distributed system provided in the present invention may use a bulk synchronous parallel (BSP) computing model that is also referred to as a bulk synchronization model or a BSP model. The master is responsible for dividing the entire graph data, allocating a computing task to the worker, and synchronizing messages. Each worker has a message queue, and each superstep is an iteration. In a superstep, each worker reads the message queue of the worker and performs parallel computing. Synchronization is performed between a plurality of supersteps. The workers send messages to exchange data. Specific principles and details of the BSP model belong to the prior art. Details are not provided herein.

The embodiments of the present invention further provide a method for processing graph data by using the distributed system described above. The master node 10 divides and schedules the graph data, processes "big data" into "small data", and schedules the small data to a plurality of worker nodes for parallel processing. The plurality of worker nodes complete graph computing together, to avoid a problem that a task of processing graph data fails due to insufficient hardware resources especially insufficient memory resources when a single-chip microcomputer or a single physical machine processes the graph data.

Figure 4:
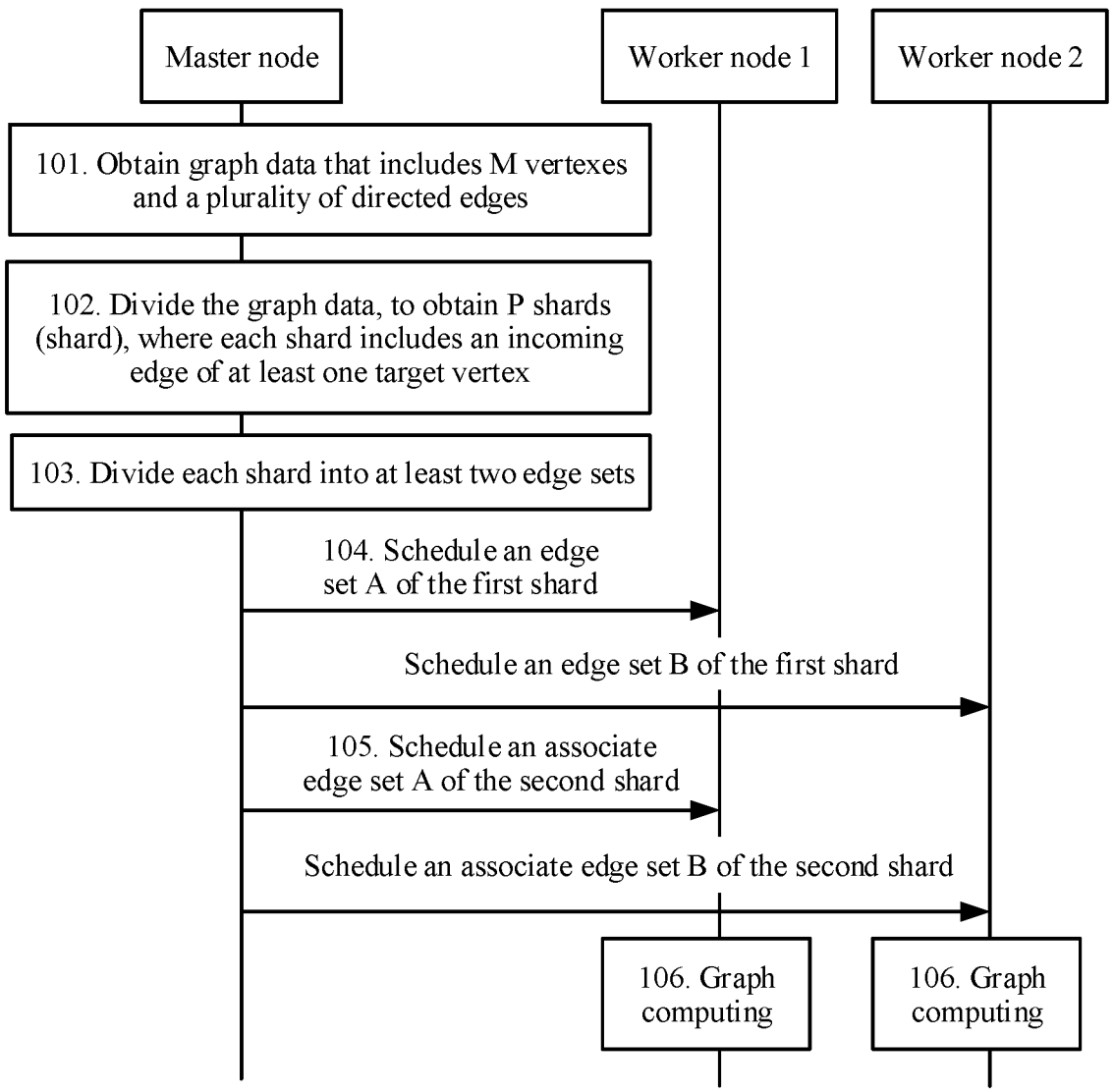
FIG. 4 is a schematic diagram of an embodiment of a graph data processing method according to embodiments of the present invention.

Specifically, refer to FIG. 4 for understanding a process in which the master node 10 processes the graph data.

As shown in FIG. 4, an embodiment of the graph data processing method provided in the embodiments of the present invention includes the following steps:

101. A master node obtains graph data, where the graph data includes M vertexes and a plurality of directional edges, each edge connects two of the M vertexes, a direction of each edge is from a source vertex to a destination vertex in the two vertexes, and M is an integer greater than 2.

The graph data in this embodiment of the present invention may be obtained by the master node from a database used to store graph data, for example, the database 40 shown in FIG. 3A. If the graph data is stored in a storage resource of the master node, the graph data may be obtained by the master node from the storage resource of the master node. Certainly, if the graph data may be stored in another manner, the master node may obtain the graph data from a corresponding storage location of the graph data.

For a form of presenting the graph data and a description about the vertexes and the edges in the graph, refer to FIG. 2 and the corresponding description of FIG. 2 for understanding. Details are not described herein again.

102. The master node divides the graph data, to obtain P shards, where each shard includes an incoming edge of at least one target vertex, the incoming edge is an edge directed to the target vertex, a sum of quantities of target vertexes corresponding to the P shards is equal to M, the target vertices corresponding to each shard are different, P is a positive integer greater than 1, and the P shards include a first shard and a second shard.

It should be noted that, in most scenarios, the master node divides the graph data into a plurality of shards, but in some special scenarios, if the graph data is extremely small, the graph data does not need to be divided, that is, only one shard exists. This embodiment of the present invention is described by using an example of a scenario of a plurality of shards.

The graph data is divided according to the vertexes. The M vertexes may be divided. The shards may be corresponding to a same quantity of vertexes or different quantities of vertexes. The shards are corresponding to different vertexes regardless of whether the shards are corresponding to the same quantity of vertexes or different quantities of vertexes. For example, as shown in FIG. 2, there are six vertexes in FIG. 2, that is, M=6 in the example shown in FIG. 2. If each shard is corresponding to two vertexes, P=6/2=3, that is, the graph data may be divided into three shards. Two vertexes corresponding to each shard are defined as target vertexes in this embodiment of the present invention. Each shard includes incoming edges of the two target vertexes corresponding to the shard, that is, edges whose arrows are directed at the target vertexes. Certainly, the shards may be corresponding to different quantities of vertexes. For example, one shard is corresponding to one target vertex, another shard is corresponding to two target vertexes, and still another shard is corresponding to three target vertexes, provided that a sum of quantities of target vertexes corresponding to all the shards is equal to M, and the target vertexes corresponding to the shards do not overlap.

Figure 5:
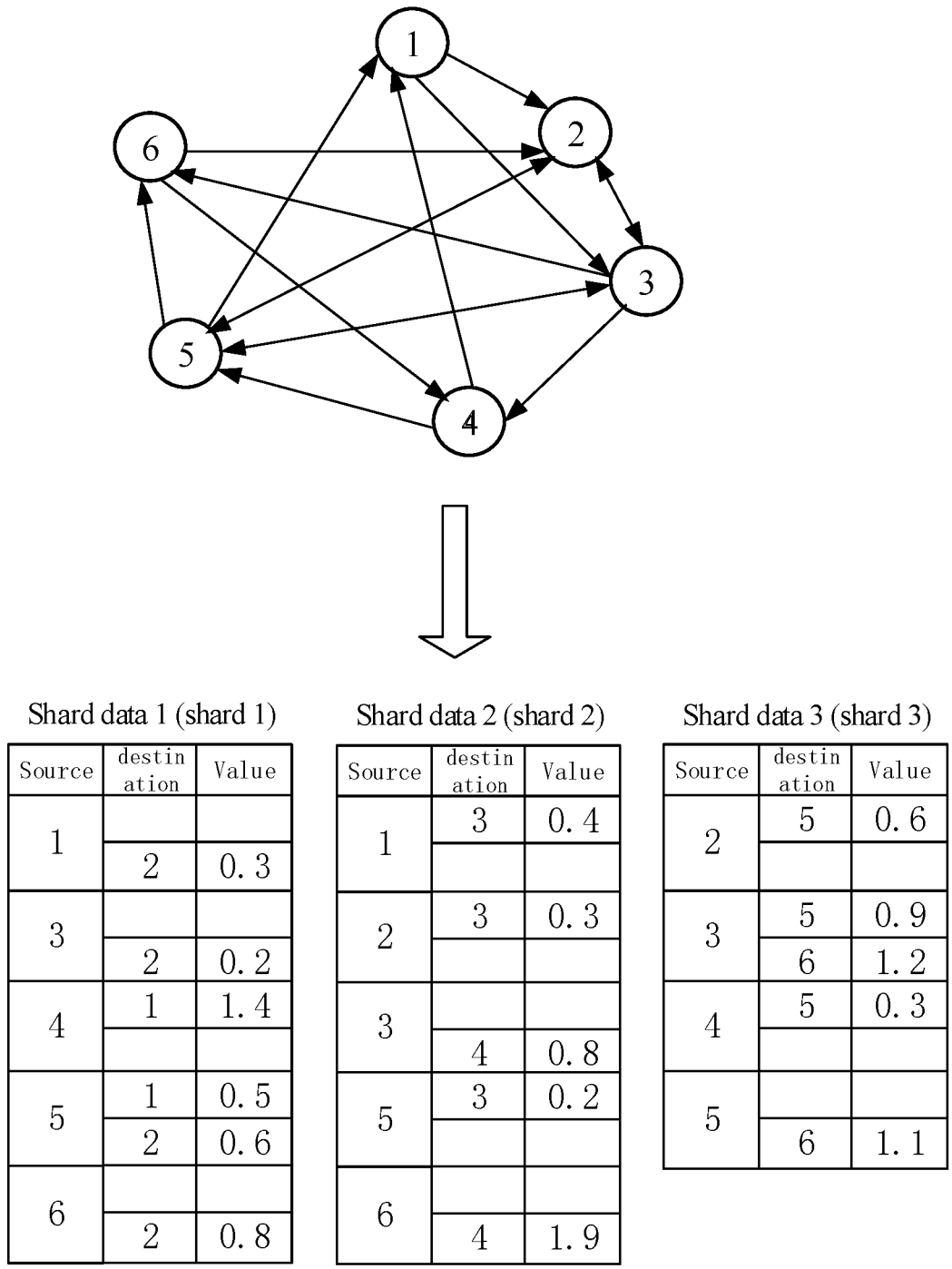
FIG. 5 is a schematic diagram of a graph data processing example according to an embodiment of the present invention.

This embodiment of the present invention is described by using an example in which the shards are corresponding to the same quantity of target vertexes. Refer to FIG. 5 for understanding shards obtained after the processing of the graph data shown in FIG. 2. As shown in FIG. 5, for the six vertexes, each shard is corresponding to two of the six vertexes, and the graph data may be processed into three shards. As shown in FIG. 5, a shard 1 is corresponding to destination vertexes 1 and 2, a shard 2 is corresponding to destination vertexes 3 and 4, and a shard 3 is corresponding to destination vertexes 5 and 6. The shard 1 is used as an example. When the shard 1 is corresponding to the target vertexes 1 and 2, source vertexes 1, 3, 4, 5, and 6 have an incoming-edge relationship with the target vertexes 1 and 2. The shard 1 includes all incoming edges of the target vertexes 1 and 2, and values of all the incoming edges. The values of the incoming edges may be obtained from a record of the graph data. The values of the incoming edges are not a focus of this embodiment of the present invention. Therefore, the values of the incoming edges are not described in detail herein. Likewise, the shard 2 includes all incoming edges of the target vertexes 3 and 4, and values of all the incoming edges; and the shard 3 includes all incoming edges of the target vertexes 5 and 6, and values of all the incoming edges.

103. The master node determines at least two edge sets from each shard.

The edge sets may be determined according to a source vertex. For example, each edge set includes a target vertex in a shard and incoming edges of determined R source vertexes, where R is a positive integer. Alternatively, the edge sets may be determined according to importance degrees of target vertexes, or may be determined according to a matrix form. That the edge sets are determined according to importance degrees of destination vertexes or according to the matrix form is described in detail in the following. Details are not provided herein. Actually, a division manner of the edge set may not be specifically limited, provided that each shard is divided into at least two parts. Because the shard is a set of edges of the target vertexes included in the shard, each part obtained after division may be an edge set.

104. The master node schedules, to at least two worker nodes for processing, at least two edge sets included in the first shard.

The first shard in this embodiment of the present invention is a relative concept. Any shard in the P shards may be understood as the first shard, and a shard other than the first shard may be understood as the second shard. That is, if the shard 1 is the first shard, the shard 2 and the shard 3 are the second shards relative to the shard 1. Likewise, if the shard 2 is the first shard, the shard 1 and the shard 3 are the second shards relative to the shard 2. If the shard 3 is the first shard, the shard 1 and the shard 2 are the second shards relative to the shard 3.

Figure 6:
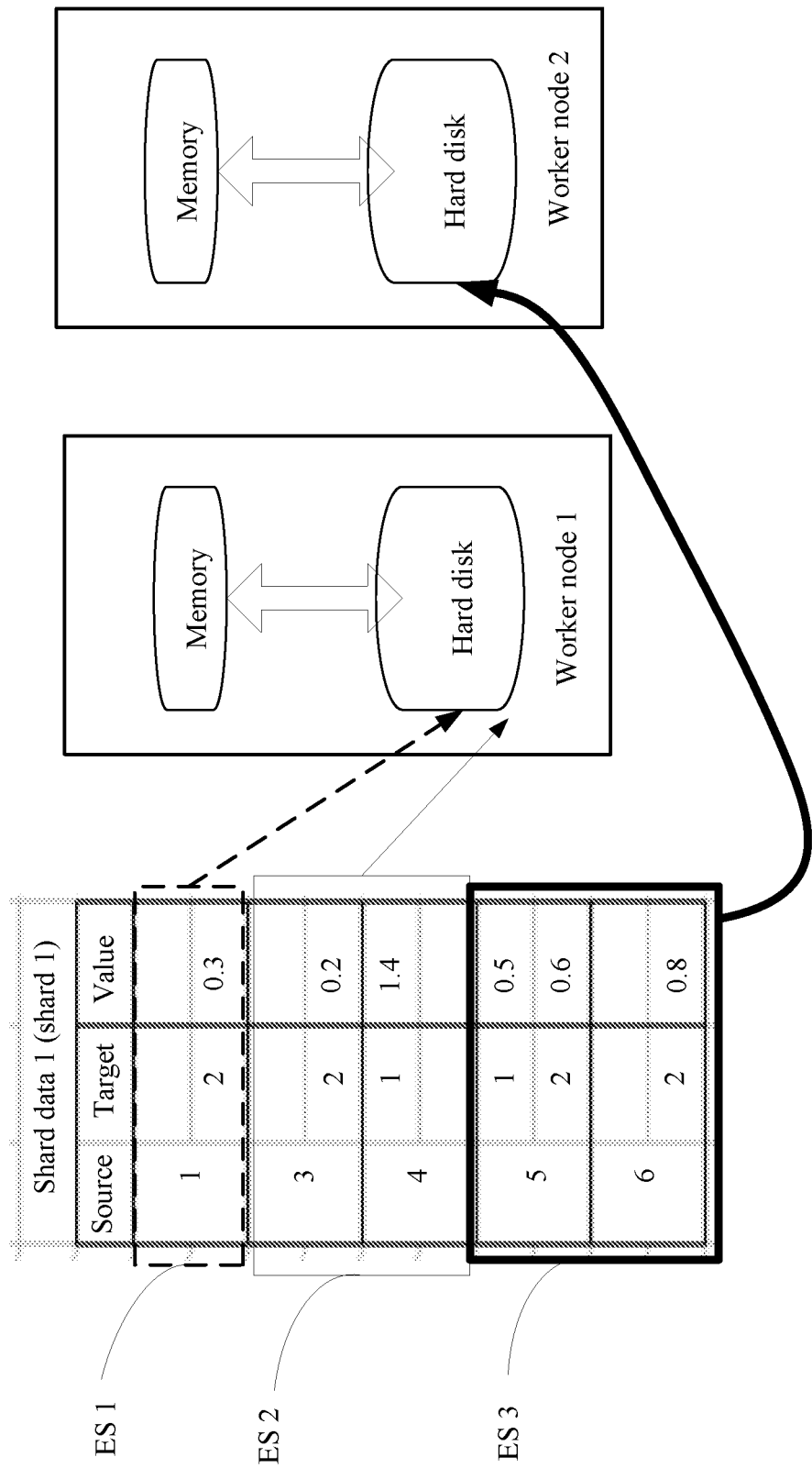
FIG. 6 is a schematic diagram of an edge set scheduling example according to an embodiment of the present invention.

For a process of scheduling edge sets, refer to FIG. 6 for understanding. As shown in FIG. 6, scheduling of edge sets in the shard 1 is used as an example. As shown in FIG. 6, the shard 1 is divided into three edge sets: an edge set ES 1, an edge set ES 2, and an edge set ES 3. If there are only two worker nodes available for scheduling, the edge set ES 1 and the edge set ES 2 may be scheduled to a worker node 1, and the edge set ES 3 may be scheduled to a worker node 2. Certainly, scheduling and allocation are not limited to the foregoing example, provided that the three edge sets are scheduled to the two worker nodes. If there are three worker nodes, each worker node may be scheduled with one edge set.

It should be noted that the at least two worker nodes in this embodiment of the present invention are worker nodes to which the edge sets are scheduled, and a quantity of at least two edge sets is not less than a quantity of at least two worker nodes.

105. The master node schedules, to the at least two worker nodes (for example, the worker node 1 and the worker node 2 in FIG. 4) for processing, an associate edge set included in the second shard, where the associate edge set is an edge set that includes an outgoing edge of a target vertex corresponding to the first shard, and the outgoing edge is an edge directed from the target vertex in the first shard.

106. The worker nodes perform graph computing on the scheduled edge sets.

Figure 8:
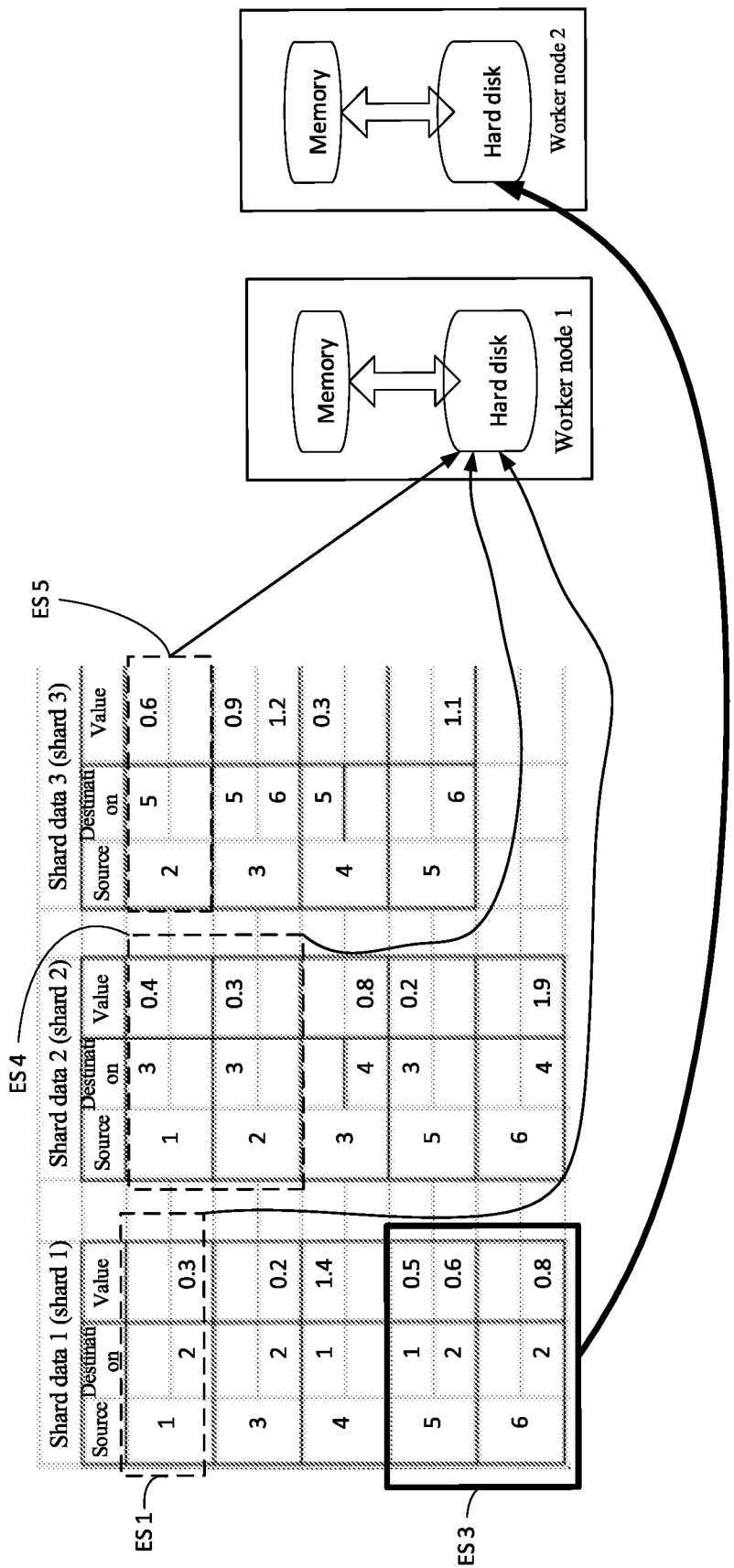
FIG. 8 is a schematic diagram of another edge set scheduling example according to an embodiment of the present invention.

In this embodiment of the present invention, a relationship between the first shard and the second shard has been described in the foregoing embodiment. Refer to the foregoing description for understanding. Details are not described herein again. As shown in FIG. 6, each shard includes an incoming edge of a target vertex corresponding to the shard. Actually, the target vertex corresponding to the shard also has a corresponding outgoing edge. For example, the shard 1 includes all incoming edges of the destination vertexes 1 and 2, and the shard 2 and the shard 3 include outgoing edges of the destination vertexes 1 and 2. As shown in FIG. 8, an edge set ES 4 and an edge set ES 5 include the outgoing edges of the destination vertexes 1 and 2. During scheduling, an edge set of outgoing edges may be scheduled to at least one of the at least two worker nodes. For example, when edge sets shown in FIG. 8 are scheduled, the edge set ES 4 and the edge set ES 5 may be scheduled to the worker node 1. Certainly, the foregoing description is merely an example. Alternatively, an edge set of outgoing edges may be scheduled to the worker node 2, provided that the edge set ES 4 and the edge set ES 5 are scheduled to a range of the worker node 1 and the worker node 2. In this way, input/output (I/O) overheads of communication between worker nodes can be reduced.

In this embodiment of the present invention, the graph data is processed by using the distributed system. The graph data is processed into the shards. Then, the edges sets in the shards are scheduled to the at least two worker nodes for graph data processing. Massive memory resources in the distributed system are fully used to process the graph data. This ensures normal processing of mass graph data, improves scalability of graph processing in a distributed computing environment, and improves overall throughput of the system. The outgoing edge of the target vertex in the first shard is scheduled to a worker node of the incoming edge, to reduce input/output (I/O) overheads of communication between the worker nodes.

Figure 7:
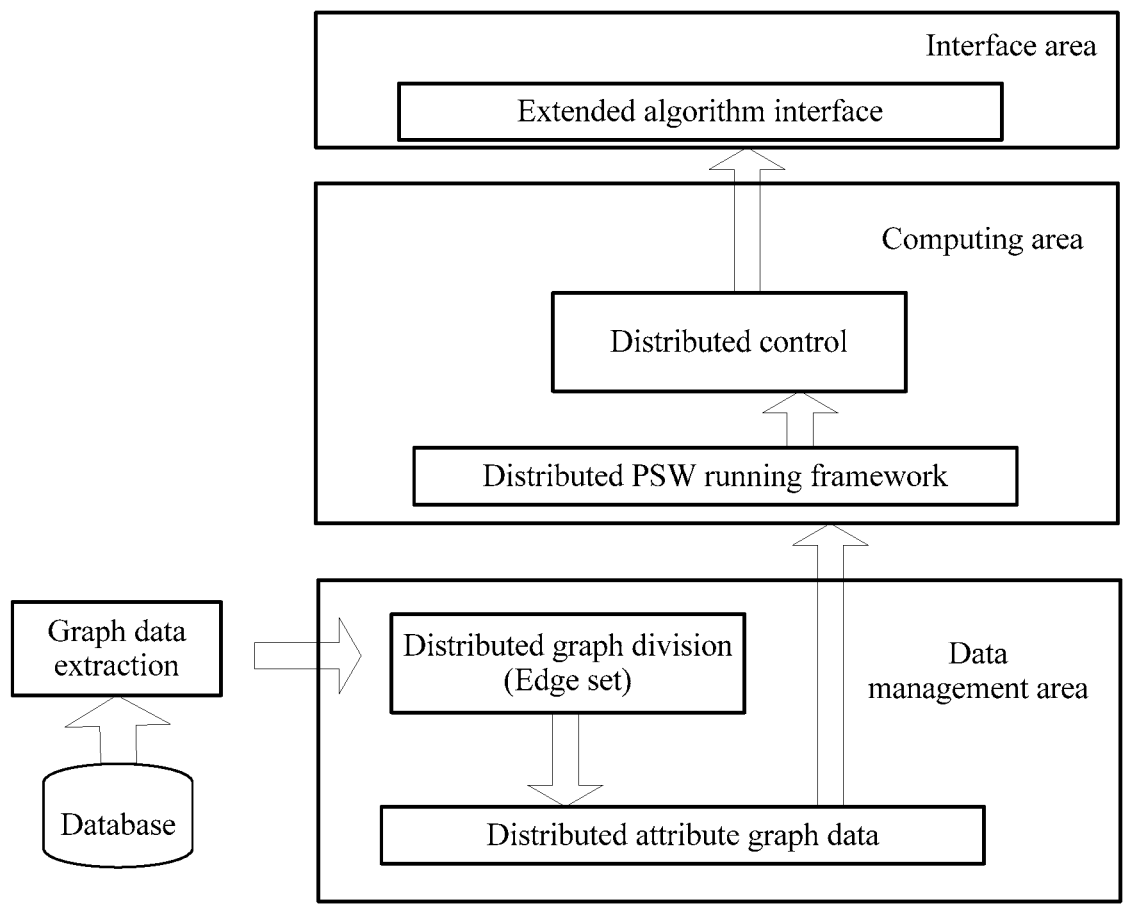
FIG. 7 is a schematic architectural diagram of graph data processing according to an embodiment of the present invention.

A logical architecture of the distributed system is shown in FIG. 7. According to FIG. 7, the distributed system may be logically divided into a database, a data management area, a computing area, and an interface area. A function of the data management area is implemented by a master node, and a function of the computing area is implemented by worker nodes. The interface area includes a user-oriented interface and a user interface (UI). The data management area is responsible for loading graph data from the database, dividing the graph data according to the processing process described in the embodiment related to FIG. 4, determining edge sets, and scheduling the edge sets to the computing area. After the computing area completes computing the graph data, a computing result is output to the interface area for presentation.

In another embodiment of the graph data processing method provided in the embodiments of the present invention, that the master node determines at least two edge sets from each shard may include:

filling, by the master node, values of edges in the P shards into a data structure in a P×P matrix form according to directions of edges, to obtain $P^2$ data blocks, where each data block is an edge set, each shard includes at least two data blocks, the P×P matrix is formed by using the M vertexes as a horizontal axis and a vertical axis; and if a vertex on the horizontal axis is a source vertex, a vertex on the vertical axis is a destination vertex; or if a vertex on the horizontal axis is a destination vertex, a vertex on the vertical axis is a source vertex.

In this embodiment of the present invention, if the vertexes in the graph data are horizontally and vertically arranged, when a vertex on a horizontal axis is a source vertex, a vertex on a vertical axis is a destination vertex; or if a vertex on a horizontal axis is a destination vertex, a vertex on a vertical axis is a source vertex. In this way, an M×M matrix can be formed, including M×M blocks. A value of an edge from a source vertex and a destination vertex can be filled in each block. During processing, the graph data is scheduled according to the edge sets. Therefore, the M×M matrix may be processed according to the quantity of target vertexes included in each shard. For example, if each shard includes N target vertexes, the graph data can be processed into a P×P matrix, and P=M/N. Certainly, if the shards include different quantities of target vertexes, the graph data can also be processed into a P×P matrix, and data blocks have different sizes in a data structure of the formed matrix form. It can be learned from the foregoing that an edge set is determined in a matrix form, so that the edge set is determined in a more orderly way, thereby improving efficiency of determining the edge set, and further improving efficiency of graph data processing.

Figure 9:
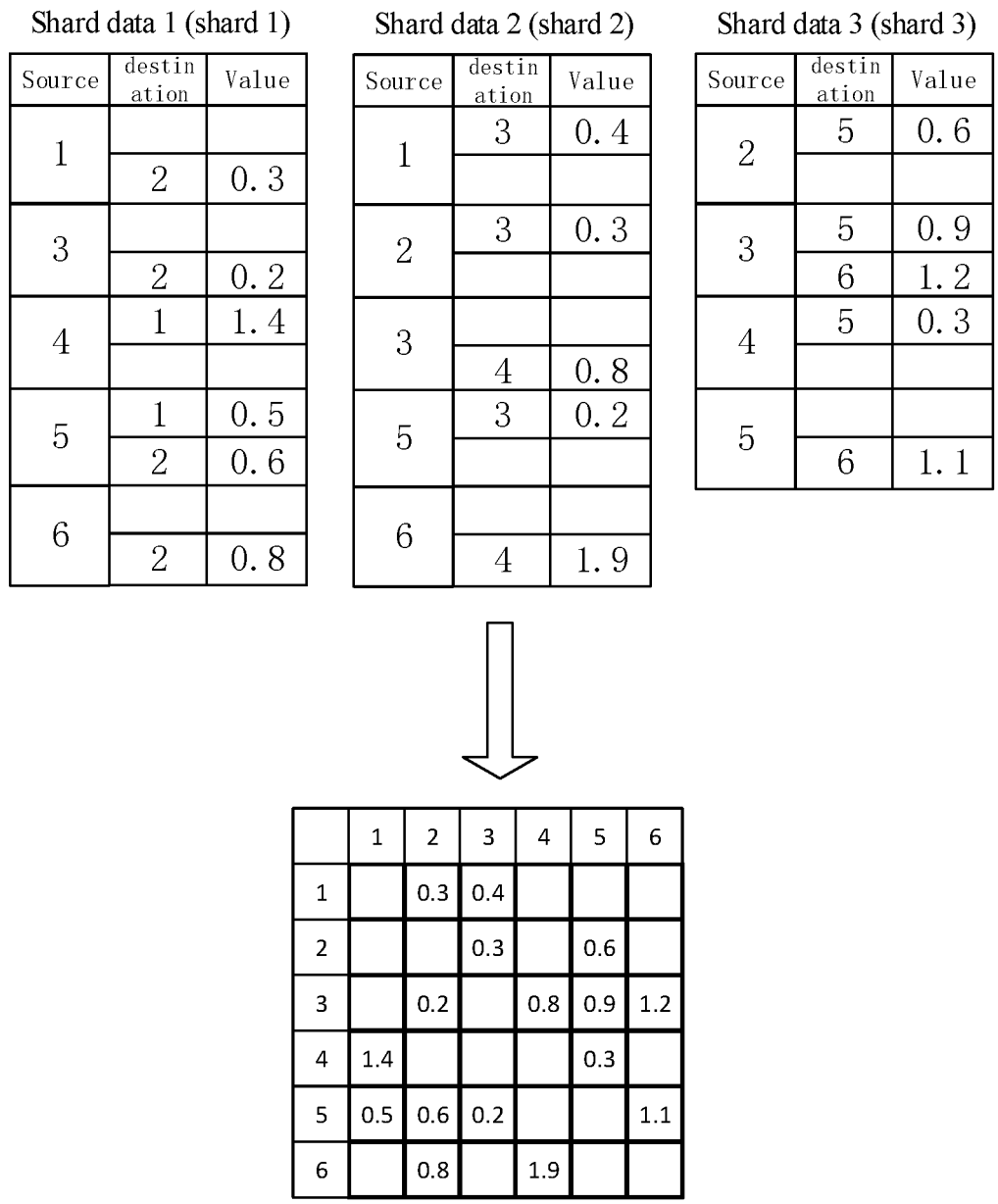
FIG. 9 is a schematic diagram of an example in which a shard is converted to a data structure in a matrix form according to an embodiment of the present invention.
Figure 10:
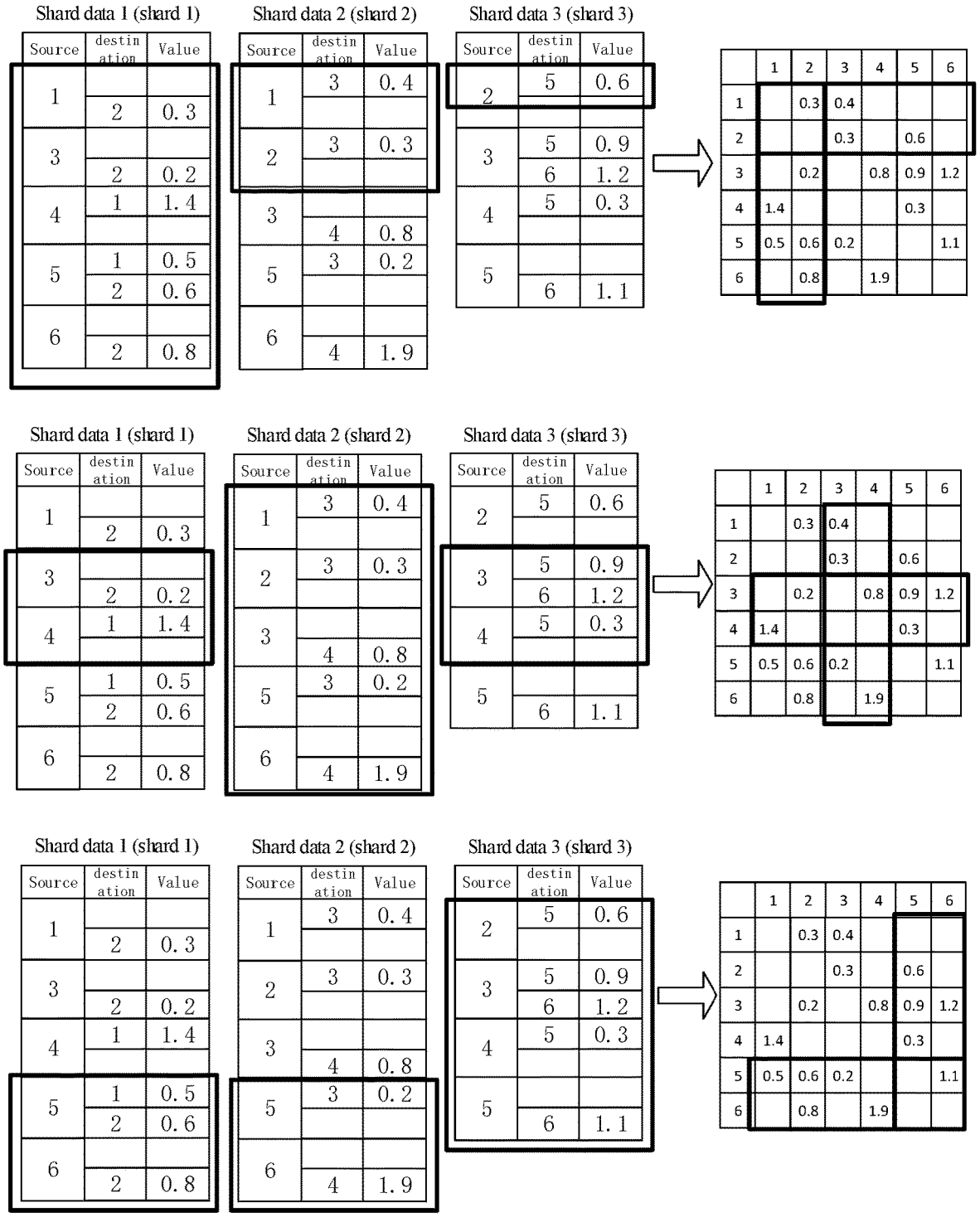
FIG. 10 is a schematic diagram of another example in which a shard is converted to a data structure in a matrix form according to an embodiment of the present invention.

As shown in FIG. 9, the values of the edges in the shard 1, the shard 2, and the shard 3 in the foregoing example are filled into a data structure in a 3×3 matrix form, to obtain $3^2$ data blocks, that is, to obtain nine data blocks.

As shown in FIG. 10A to FIG. 10D, FIG. 10A to FIG. 10D show a correspondence between nine data blocks in a data structure of a 3×3 matrix form and edge sets of incoming edges of target vertexes corresponding to the shard 1, the shard 2, and the shard 3 and of outgoing edges of the target vertexes in other shards.

Optionally, in another embodiment of the graph data processing method provided in the embodiments of the present invention, the method may further include:
  setting, by the master node, a unique block identifier for each of the $P^2$ data blocks; and
  determining, by the master node, a correspondence between the block identifiers of the $P^2$ data blocks and a plurality of worker nodes.

That the master node schedules, to at least two worker nodes for processing, at least two edge sets included in the first shard may include:
  scheduling, by the master node according to the correspondence to the at least two worker nodes for processing, at least two data blocks included in the first shard.

Figure 11:
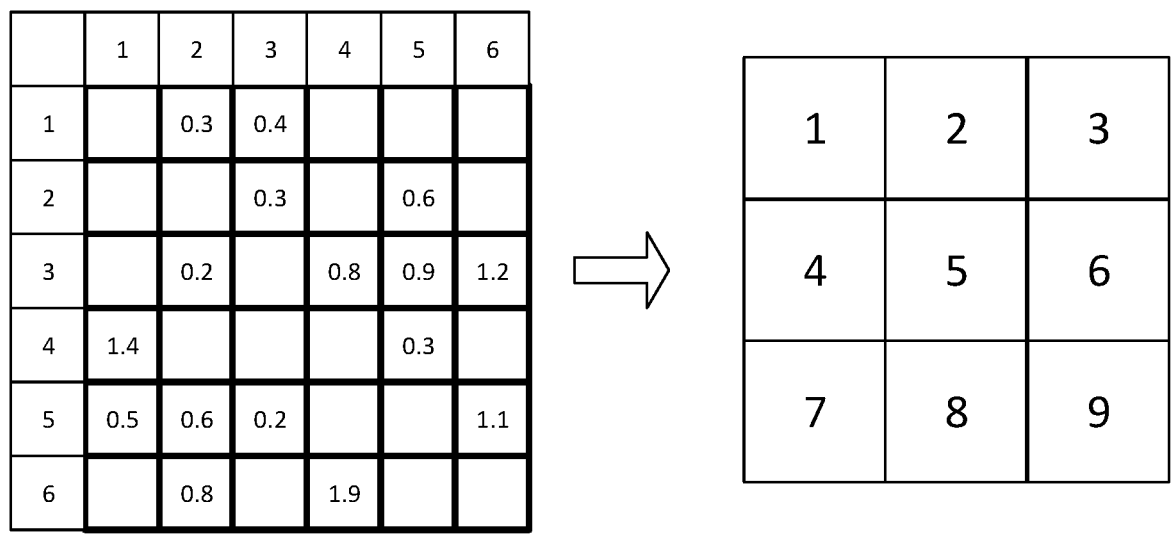
FIG. 11 is a schematic diagram of a correspondence between a data block and a block identifier according to an embodiment of the present invention.

In this embodiment of the present invention, for ease of scheduling, a block identifier that can indicate a sequence relationship may be set for each data block. For example, as shown in FIG. 11, each data block is numbered according to a horizontal or vertical sequence from a vertex 1 and a vertex 2. In FIG. 11, the data blocks are numbered row by row from left to right. Certainly, the data blocks may be numbered column by column from top to bottom. A specific sequence of setting block identifiers is not limited in this embodiment of the present invention, provided that the block identifier can represent the sequence. Alternatively, the block identifier may be a letter instead of a number.

After the block identifier is set for the data block, it is necessary to record the correspondence between the block identifier and the data block, to facilitate proper scheduling. After the block identifier is set, the master node only needs to schedule the data blocks of the incoming edges to the worker nodes according to the sequence of setting the block identifiers. It can be learned from the foregoing that the data blocks can be scheduled according to the block identifiers after the block identifiers are set for the data blocks. Therefore, the data blocks are scheduled in a more orderly and more efficient way, so as to improve efficiency of graph data processing.

Optionally, in another embodiment of the graph data processing method provided in the embodiments of the present invention, that the master node schedules, to the at least two worker nodes for processing, an associate edge set included in the second shard may include:
  scheduling, by the master node according to the correspondence to the at least two worker nodes for processing, data blocks corresponding to the associate edge set.

Figure 12:
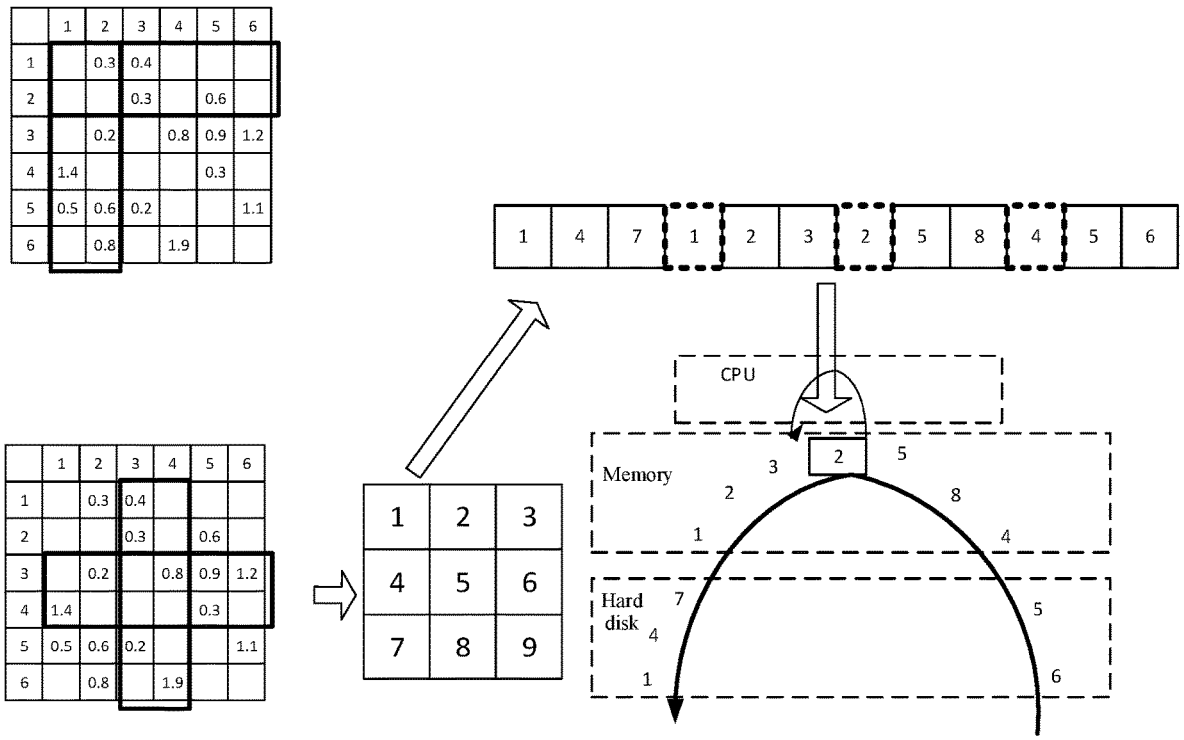
FIG. 12 is a schematic diagram of a coarse-granularity scheduling example according to an embodiment of the present invention.

In this embodiment of the present invention, as shown in FIG. 12, after the block identifier is set for each data block in the data structure, the data blocks can be scheduled according to the scheduling sequence indicated by the block identifiers. As shown in FIG. 12, the scheduling sequence is 1, 4, 7, 1, 2, 3, 2, 5, 8, 4, 5, 6, and the like. A data block 1 indicated by B1, a data block 2 indicated by B2, and a data block 4 indicated by B3 have been scheduled, and are not scheduled again. In this way, I/O overheads can be reduced. In addition, a hard disk, a memory, and a central processing unit CPU shown in FIG. 12 are not resources of a same worker node and not particularly distinguished, provided that the scheduling sequence is described herein. For a scheduling relationship between the data blocks and the worker nodes, refer to descriptions about FIG. 6 and FIG. 8 for understanding.

From a perspective of a worker node, in another embodiment of the graph data processing method provided in the embodiments of the present invention, each worker node includes an I/O interface, a hard disk, a memory, and a processor.

A first worker node receives, by using an I/O interface, X edge sets that are scheduled by a master node according to a scheduling sequence from P shards. The P shards are obtained after the master node divides graph data. The graph data includes M vertexes and a plurality of directional edges. Each edge connects two of the M vertexes. A direction of each edge is from a source vertex to a destination vertex in the two vertexes. M is an integer greater than 2. Each shard includes an incoming edge of at least one target vertex. The incoming edge is an edge directed to the target vertex. A sum of quantities of target vertexes corresponding to the P shards is equal to M. The target vertices corresponding to each shard are different. P is a positive integer greater than 1, and X is a positive integer.

The X edge sets are stored in a hard disk by using the I/O interface of the first worker node.

A processor of the first worker node loads, to a memory according to the scheduling sequence of the master node, Y edge sets in the X edge sets stored in the hard disk, and extracts data of Z edge sets from the memory for graph computing, where $X \geq Y \geq Z$, and X, Y, and Z are all positive integers.

In this embodiment of the present invention, FIG. 12 show scheduling performed according to block identifiers, that is, coarse-granularity scheduling. Actually, after the scheduling performed according to block identifiers, a worker node further needs to extract data of an edge set in a data block indicated by a block identifier, and then schedule the data of the edge set to a corresponding worker node for graph computing. Herein, scheduling the data of the edge set is fine-granularity scheduling.

Figure 13:
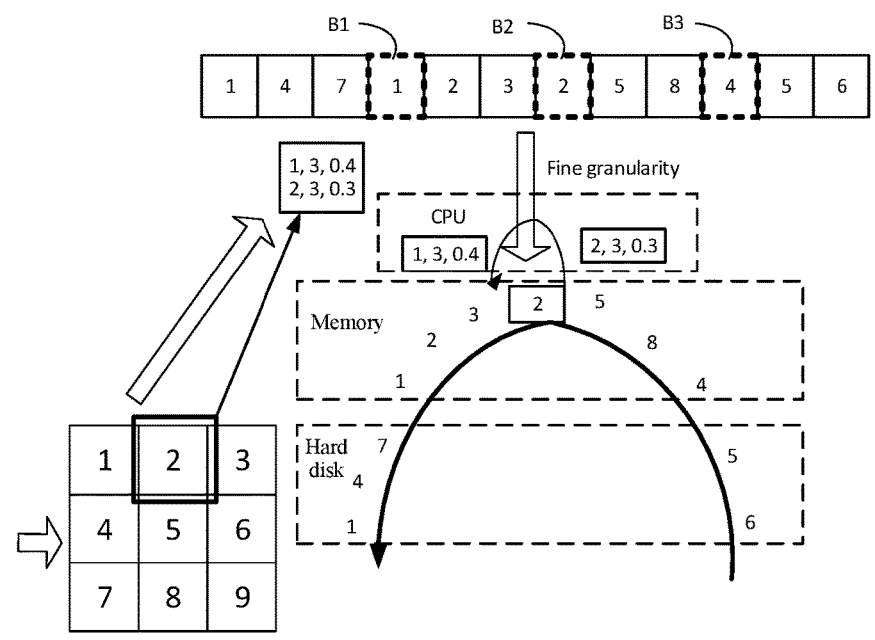
FIG. 13 is a schematic diagram of a fine-granularity scheduling example according to an embodiment of the present invention.

As shown in FIG. 13, a data block 2 in the figure is used as an example. Data of an edge set in the data block includes (1, 3, 0.4) and (2, 3, 0.3). When the data block 2 is scheduled according to coarse-granularity scheduling, during graph computing, a worker node to which the data block 2 is scheduled loads Y of X edge sets from a hard disk to a memory according to a scheduling sequence, and extracts data of Z edge sets for graph computing. For example, during computing of the data block 2, a CPU extracts (1, 3, 0.4) and (2, 3, 0.3) for graph computing.

Generally, a quantity of edge sets in a hard disk of a worker node is greater than a quantity of edge sets in a memory, and the quantity of edge sets in the memory is greater than a quantity of edge sets processed by a CPU. During graph computing, the CPU loads a small quantity of edge sets to the memory according to a scheduling sequence, and then performs graph computing on the edge sets one by one according to the scheduling sequence. That is, the worker node uses a streaming processing manner. In the streaming processing manner, the memory can be less occupied, memory overheads can be reduced, and efficiency of graph computing can be improved.

Optionally, from a perspective of the master node, in another embodiment of the graph data processing method provided in the embodiments of the present invention, the method may further include:

setting, by the master node, a synchronization flag.

The synchronization flag is used to instruct a worker node where a first data block is located to perform data synchronization with a worker node where a second data block is located after processing the first data block. The first data block is a last scheduled data block according to a scheduling sequence in the first shard, and the second data block is a last scheduled data block in the data blocks corresponding to the associate edge set.

In this embodiment of the present invention, a shard 1, a shard 2, and a shard 3 are used as an example. Three data blocks 1, 4, and 7 in the shard 1, a data block 2 in the shard 2, and a data block 3 in the shard 3 belong to an edge set associated with destination vertexes 1 and 2. The data blocks 1, 4, 7, 2, and 3 may be understood as a data group. Because the data blocks 1, 4, and 7 are not scheduled to a same worker node, a worker node needs to be synchronized with another node after the worker node processing a last data block in a group allocated to the worker node. After all worker nodes complete processing all data blocks in this group, the worker node can perform graph computing of a next group of data blocks.

Figure 14:
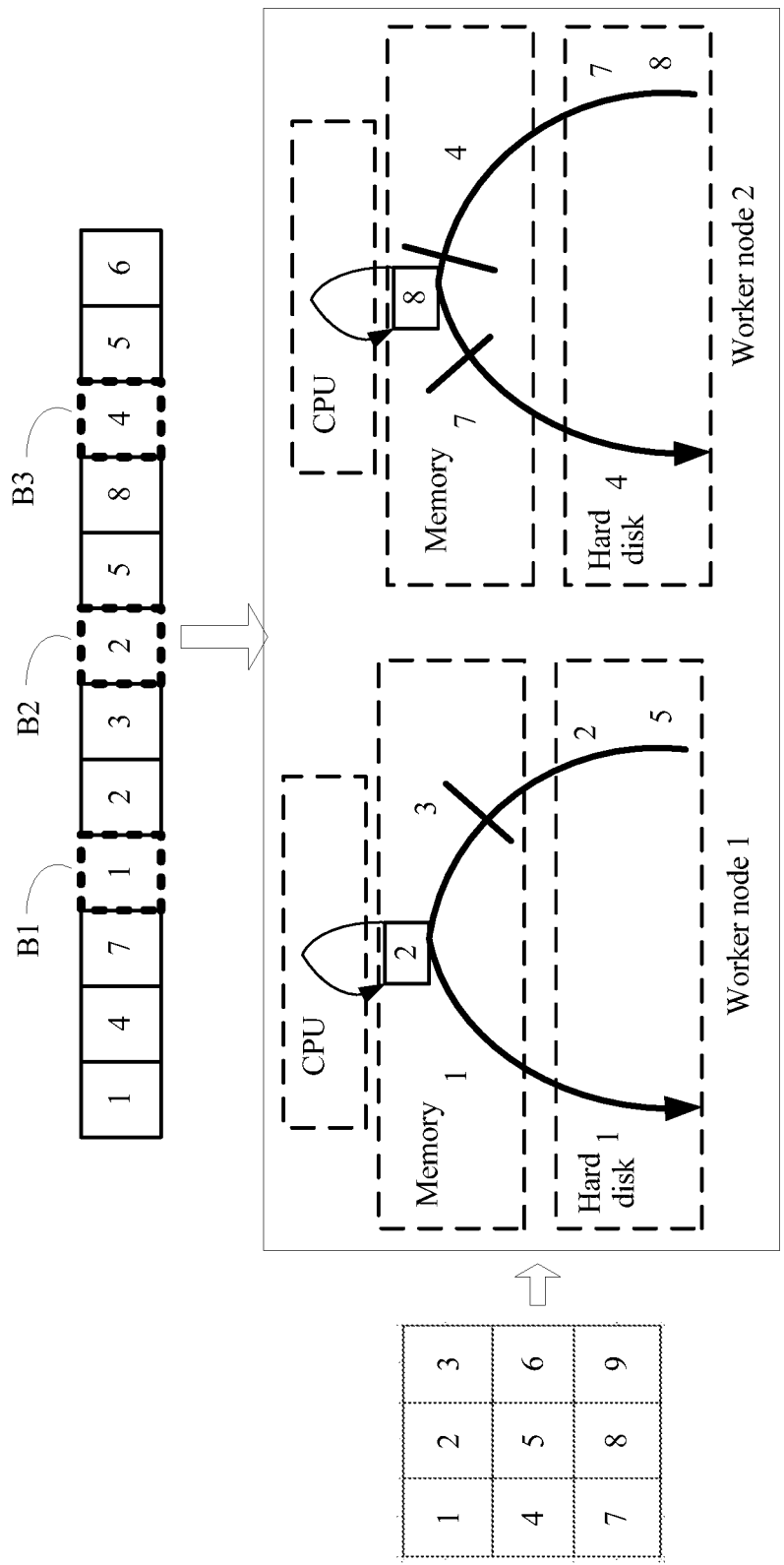
FIG. 14 is a schematic diagram of a data block scheduling example according to an embodiment of the present invention.

As shown in FIG. 14, that the nine data blocks are scheduled to two worker nodes is used as an example. According to a vertex-cut method, it is determined that the data blocks 1, 2, 3, 5, and 6 in the nine data blocks are to be scheduled to the worker node 1, and the data blocks 4, 7, 8, and 9 are to be scheduled to the worker node 2. For the data blocks 1, 4, 7, 2, and 3 in a first group of data blocks, the data block 7 is a data block that is last scheduled to the worker node 2 from the first shard, and a first synchronization flag needs to be set after the data block. The data block 3 is a data block that is last scheduled to the worker node 1 from the second shard, and a second synchronization flag needs to be set after the data block 3. Actually, the first synchronization flag may be the same as the second synchronization flag, to indicate that the worker node needs to perform data synchronization.

Optionally, in another embodiment of the graph data processing method provided in the embodiments of the present invention, that the master node determines the at least two edge sets from each shard may include:

determining, by the master node, a degree of a target vertex in each shard, where the degree indicates closeness of association between the target vertex and another vertex; and when a degree of a first target vertex exceeds a preset threshold, classifying, by the master node, incoming edges of the first target vertex into a same edge set.

As described in the foregoing embodiment, shards are obtained by means of division according to a matrix form. Actually, to reduce I/O overheads, the edge sets can be obtained by means of classification according to degrees of target vertexes. For example, in target vertexes corresponding to the shard 1, if a degree of a target vertex 2 is extremely high and exceeds a preset threshold, all incoming edges of the target vertex 2 may be classified to a same edge set.

In an embodiment, if the distributed system uses the deployment manner shown in FIG. 3A and FIG. 3B, that is, the master node and the worker nodes are physical hosts connected by using a network, the processor 510 of the physical host may execute the program in the memory 530 to complete all or some steps executed by the master node described in the foregoing embodiments. Correspondingly, all or some steps executed by the worker nodes described in the foregoing embodiments may be implemented in a similar manner. According to a general explanation, the term "program" used in this embodiment of the present invention should include but not be limited to an instruction, an instruction set, code, a code segment, a subroutine, a software module, an application, a software package, a thread, a process, a function, a firmware, a middleware, and the like.

In an embodiment, if the distributed system uses the deployment manner shown in FIG. 3C, that is, the master node and the worker nodes are all virtual machines, the virtual machine corresponding to the master node may provide various hardware resources by using a virtual hardware platform, such as a virtual processor (for example, a VCPU) and a virtual memory, and execute a program to implement all or some steps executed by the master node described in the foregoing embodiments. Correspondingly, the virtual machine corresponding to the worker nodes may also implement, in a similar manner, all or some steps performed by the worker nodes described in the foregoing embodiments.

Figure 15:
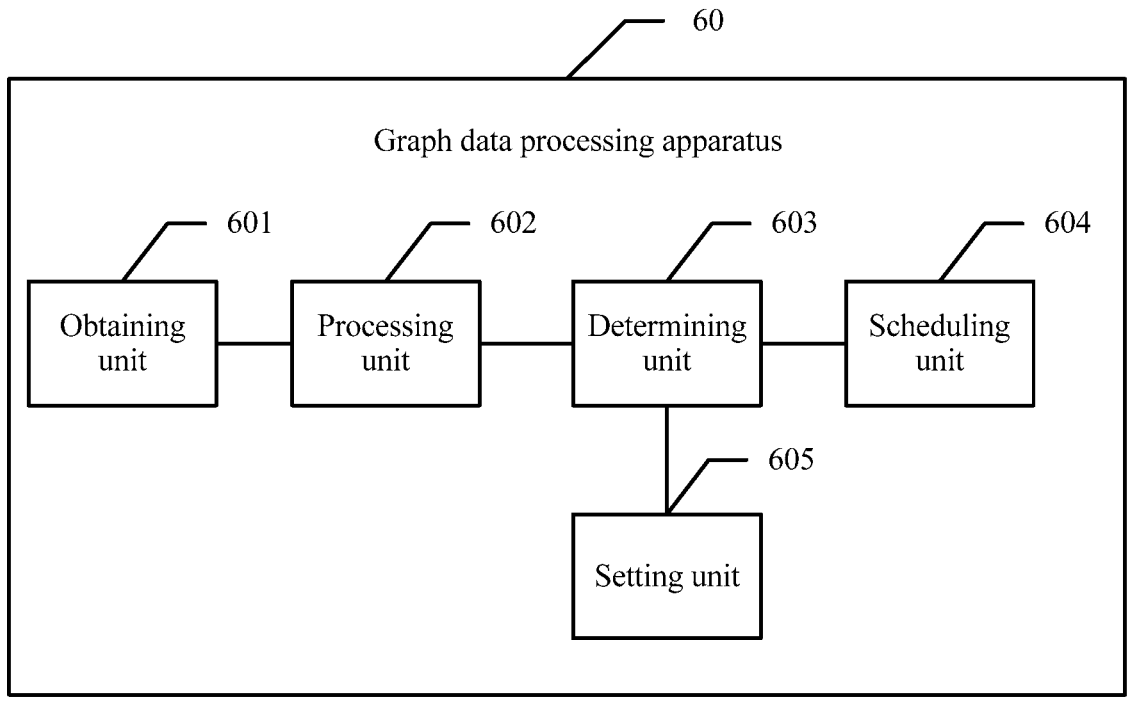
FIG. 15 is a schematic diagram of a graph data processing apparatus according to an embodiment of the present invention.

Referring to FIG. 15, an embodiment of the present invention further provides a graph data processing apparatus 60. The data processing apparatus 60 may be the master node in FIG. 3A to FIG. 14. The graph data processing apparatus 60 includes:

an obtaining unit 601, a processing unit 602, a determining unit 603, a scheduling unit 604, a setting unit 605, and a recording unit 606.

The obtaining unit 601 may be the I/O interface in FIG. 3B. The processing unit 602, the determining unit 603, the scheduling unit 604, the setting unit 605, and the recording unit 606 may all be the processor in FIG. 3B.

The obtaining unit 601 may perform an operation process of step 101 in FIG. 4.

The processing unit 602 may perform an operation process of step 102 in FIG. 4.

The determining unit 603 may perform an operation process of step 103 in FIG. 4, and operation processes related to a step of determining in FIG. 3A to FIG. 14.

The scheduling unit 604, the setting unit 605, and the recording unit 606 may separately perform corresponding operation processes of the graph data processing method.

For functions of the foregoing units, refer to related descriptions corresponding to FIG. 3A to FIG. 14 for understanding. Details are not described herein again.

Figure 16:
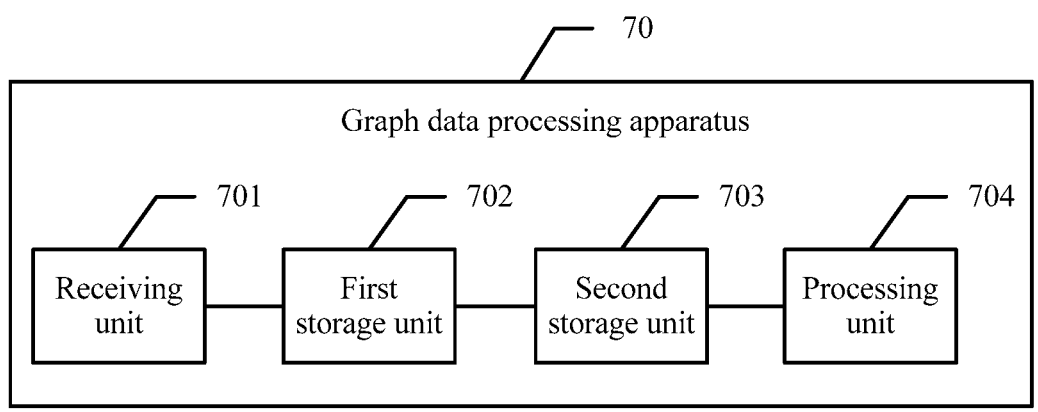
FIG. 16 is another schematic diagram of a graph data processing apparatus according to an embodiment of the present invention.

Referring to FIG. 16, an embodiment of the present invention further provides another graph data processing apparatus 70. The data processing apparatus 70 may be the worker node in FIG. 3A to FIG. 14. The graph data processing apparatus 70 includes:

a receiving unit 701, a first storage unit 702, a second storage unit 702, and a processing unit 704, where the receiving unit 701 may be the I/O interface in FIG. 3B, the first storage unit 702 may be the hard disk in FIG. 3B, the second storage unit 703 may be the memory in FIG. 3B, and the processing unit 704 may be the processor in FIG. 3B.

The receiving unit 701, the first storage unit 702, the second storage unit 703, and the processing unit 704 may separately perform operation processes corresponding to the worker node side in the graph data processing method. For functions of the units 701 to 704, refer to descriptions on the worker node side in the graph data processing method. Details are not described herein again.

A person of ordinary skill in the art may understand that all or some steps performed by the master node and the worker nodes described in the foregoing embodiments may be implemented by a program instructing related hardware (such as a processor). The program may be stored in a computer readable storage medium. The storage medium may include: a ROM, a RAM, a magnetic disk, an optical disc, or the like. According to a general explanation, the term "program" used in this embodiment of the present invention should include but not be limited to an instruction, an instruction set, code, a code segment, a subroutine, a software module, an application, a software package, a thread, a process, a function, a firmware, a middleware, and the like.

The graph data processing method and apparatus, and the system provided in the embodiments of the present invention are described in detail above. The principles and implementations of the present invention are describes herein by using specific examples. The description about the embodiments is merely used to help understand the method and core ideas of the present invention. In addition, a person of ordinary skill in the art can make modifications to the present invention in terms of the specific implementations and application scopes according to the ideas of the present invention. Therefore, the content of this specification shall not be construed as a limit to the present invention.

What is claimed is:

1. A graph data processing method, comprising:
obtaining, by a master node, graph data comprising M vertexes and a plurality of edges, each of the M vertexes is at least one of a source vertex and a destination vertex, wherein M is an integer greater than two, and wherein each of the plurality of edges is associated with a value, a source vertex and a destination vertex of the M vertexes;
dividing, by the master node, the graph data, into P shards, wherein P is an integer greater than or equal to two, each of the P shards comprises a unique portion of the plurality of edges associated with destination vertexes selected from a non-overlapping subset of the M vertexes, and wherein the unique portion of the plurality of edges is divided into at least two edge sets, each of the at least two edge sets comprises one or more edges associated with source vertexes selected from the non-overlapping subset of the M vertexes;
scheduling, by the master node, a group of edge sets to one of at least two groups of worker nodes, wherein the group of edge sets are the at least two edge sets comprised in a first shard and an associate edge set of the at least two edge sets comprised in a second shard, wherein edges of the associate edge set are associated with one or more source vertexes selected from a non-overlapping subset of destination vertexes associated with the first shard; and
adding, by the master node, a synchronization flag after an edge set of the group of edge sets, wherein the edge set is a last scheduled edge set of the group of edge sets based on a scheduling sequence, and wherein the synchronization flag indicating a corresponding group of worker nodes of the at least two groups of worker nodes to perform data synchronization with rest of the at least two groups of worker nodes.

2. The method of claim 1, wherein the associate edge set is a first associate edge set, and the method further comprises:
scheduling, by the master node, a subset of the at least two edge sets comprised in the second shard and a second associate edge set of the at least two edge sets comprised in the first shard to be processed by another one of at least two groups of worker nodes, wherein the one or more edges of the second associate edge set are associated with one or more source vertexes selected from the non-overlapping subset of destination vertexes associated with the second shard.

3. The method of claim 2, wherein the first associate edge set and the at least two edge sets comprised in the first shard are not included in the subset.

4. The method of claim 1, further comprising:
assigning a block identifier to each of the at least two edge sets of each of the P shards, wherein the scheduling sequence is generated based on ordering the block identifier assigned to each of the at least two edge sets of each of the P shards, and wherein the scheduling is based on scheduling corresponding block identifiers selected from the scheduling sequence to be processed by the one of at least two groups of worker nodes.

5. The method of claim 4, wherein the block identifiers are ordered into the scheduling sequence based on a source vertex and a destination vertex associated with each of the at least two edge sets of each of the P shards.

6. A graph data processing method, comprising:
receiving, by a worker node through an I/O interface, X set of edges included in graph data that are scheduled by a master node according to a sequential order to be processed by the worker node, wherein the graph data comprises M vertexes and a plurality of edges, each of the M vertexes is at least one of a source vertex and a destination vertex, where M is an integer greater than two, each of the plurality of edges is associated with a value, a source vertex and a destination vertex of the M vertexes, wherein the graph data is divided by the master node into P shards, where P is an integer greater than or equal to two, each of the P shards comprises a unique portion of the plurality of edges associated with destination vertexes selected from a non-overlapping subset of the M vertexes, and the unique portion of the plurality of edges is divided into at least two edge sets, each of the at least two edge sets comprises one or more edges associated with source vertexes selected from the non-overlapping subset of the M vertexes, wherein each of the non-overlapping subset of the at least two edge sets comprised in a first shard comprises a synchronization flag after an edge set of a corresponding non-overlapping subset, wherein the edge set is a last scheduled edge set of each of the non-overlapping subset based on a scheduling sequence, and wherein the synchronization flag indicating a corresponding group of worker nodes of at least two groups of worker nodes to perform data synchronization with rest of the at least two groups of worker nodes;

storing the X set of edges in a hard disk by using the I/O interface of the worker node;

loading, by at least one processor of the worker node to a memory according to the sequential order, Y of the X set of edges stored in the hard disk; and extracting data associated with Z of the Y set of edges from the memory for graph computing, where X, Y, and Z are natural numbers.

7. The method according to claim 6, further comprises:
processing, by the worker node, the synchronization flag added by the master node after a last set of edges of the X set of edges according to the sequential order; and
performing, by the worker node based on the synchronization flag, data synchronization with another worker node that receives at least a portion of the graph data scheduled by the master node.

8. A graph data processing apparatus, comprising:
at least one processor; and
a non-transitory computer-readable storage medium coupled to the at least one processor and storing programming instructions for execution by the at least one processor, the programming instructions instruct the at least one processor to:
obtain graph data comprising M vertexes and a plurality of edges, each of the M vertexes is at least one of a source vertex and a destination vertex, wherein M is an integer greater than two, and wherein each of the plurality of edges is associated with a value, a source vertex and a destination vertex of the M vertexes;
divide the graph data, into P shards, wherein P is an integer greater than or equal to two, each of the P shards comprises a unique portion of the plurality of edges associated with destination vertexes selected from a non-overlapping subset of the M vertexes, and wherein the unique portion of the plurality of edges is divided into at least two edge sets, each of the at least two edge sets comprises one or more edges associated with source vertexes selected from the non-overlapping subset of the M vertexes;
schedule a group of edge sets to one of at least two groups of worker nodes, wherein the group of edge sets are the at least two edge sets comprised in a first shard and an associate edge set of the at least two edge sets comprised in a second shard, wherein edges of the associate edge set are associated with one or more source vertexes selected from a non-overlapping subset of destination vertexes associated with the first shard; and
add a synchronization flag after an edge set of the group of edge sets, wherein the edge set is a last scheduled edge set of the group of edge sets based on a scheduling sequence, and wherein the synchronization flag indicating a corresponding group of worker nodes of the at least two groups of worker nodes to perform data synchronization with rest of the at least two groups of worker nodes.

9. The apparatus of claim 8, wherein the associate edge set is a first associate edge set, and the programming instructions further instruct the at least one processor to:
schedule a subset of the at least two edge sets comprised in the second shard and a second associate edge set of the at least two edge sets comprised in the first shard to be processed by another one of at least two groups of worker nodes, wherein the one or more edges of the second associate edge set are associated with one or more source vertexes selected from the non-overlapping subset of destination vertexes associated with the second shard.

10. The apparatus of claim 9, wherein the first associate edge set and the at least two edge sets comprised in the first shard are not included in the subset.

11. The apparatus of claim 8, the programming instructions further instruct the at least one processor to:
assign a block identifier to each of the at least two edge sets of each of the P shards, wherein the scheduling sequence is generated based on ordering the block identifier assigned to each of the at least two edge sets of each of the P shards, and wherein the scheduling is based on scheduling corresponding block identifiers selected from the scheduling sequence to be processed by the at least two worker nodes.

12. The apparatus of claim 11, wherein the block identifiers are ordered into the scheduling sequence based on a source vertex and a destination vertex associated with each of the at least two edge sets of each of the P shards.

13. A graph data processing apparatus, comprising:
an I/O interface;
a hard disk;
a memory;
a cache;
at least one processor; and
a non-transitory computer-readable storage medium coupled to the at least one processor and storing programming instructions for execution by the at least one processor, the programming instructions instruct the at least one processor to:
receive, through the I/O interface, X set of edges included in graph data that are scheduled by a master node according to a sequential order to be processed by a worker node, wherein the graph data comprises M vertexes and a plurality of edges, each of the M vertexes is at least one of a source vertex and a destination vertex, where M is an integer greater than two, each of the plurality of edges is associated with a value, a source vertex and a destination vertex of the M vertexes, and wherein the graph data is divided by the master node into P shards, where P is an integer greater than or equal to two, each of the P shards comprises a unique portion of the plurality of edges associated with destination vertexes selected from a non-overlapping subset of the M vertexes, and the unique portion of the plurality of edges is divided into at least two edge sets, each of the at least two edge sets comprises one or more edges associated with source vertexes selected from the non-overlapping subset of the M vertexes, wherein each of the non-overlapping subset of the at least two edge sets comprised in a first shard comprises a synchronization flag after an edge set of a corresponding non-overlapping subset, wherein the edge set is a last scheduled edge set of each of the non-overlapping subset based on a scheduling sequence, and wherein the synchronization flag indicating a corresponding group of worker nodes of at least two groups of worker nodes to perform data synchronization with rest of the at least two groups of worker nodes;

store the X set of edges in the hard disk by using the I/O interface of the worker node;

load, by the at least one processor to the memory according to the sequential order, Y of the X set of edges stored in the hard disk; and extract data associated with Z of the Y set of edges from the memory to the cache for graph computing, where X, Y, and Z are natural numbers.

14. The apparatus according to claim 13, the programming instructions instruct the at least one processor to:

process the synchronization flag added by the master node after a last set of edges of the X set of edges according to the sequential order; and perform, based on the synchronization flag, data synchronization with another worker node that receives at least a portion of the graph data scheduled by the master node.

* * * * *